(12) United States Patent
Barajas Hernandez et al.

(10) Patent No.: US 10,593,108 B2
(45) Date of Patent: Mar. 17, 2020

(54) CONVERTING DIGITAL AERIAL IMAGES INTO A THREE-DIMENSIONAL REPRESENTATION UTILIZING PROCESSING CLUSTERS

(71) Applicant: Skycatch, Inc., San Francisco, CA (US)

(72) Inventors: Manlio Francisco Barajas Hernandez, Jalisco (MX); David Chen, San Francisco, CA (US); Pablo Arturo Martinez Gonzalez, Jalisco (MX); Christian Sanz, San Francisco, CA (US)

(73) Assignee: Skycatch, Inc., San Francisco, CA (US)

( * ) Notice: Subject to any disclaimer, the term of this patent is extended or adjusted under 35 U.S.C. 154(b) by 46 days.

(21) Appl. No.: 15/799,576

(22) Filed: Oct. 31, 2017

(65) Prior Publication Data
US 2019/0130641 A1 May 2, 2019

(51) Int. Cl.
| | |
|---|---|
| *G06F 15/80* | (2006.01) |
| *G06T 17/05* | (2011.01) |
| *G06K 9/62* | (2006.01) |
| *G06T 7/73* | (2017.01) |
| *G06K 9/00* | (2006.01) |
| *G06T 17/20* | (2006.01) |
| *G06T 7/00* | (2017.01) |
| *G06T 15/00* | (2011.01) |

(52) U.S. Cl.
CPC ............ *G06T 17/05* (2013.01); *G06K 9/0063* (2013.01); *G06K 9/622* (2013.01); *G06K 9/6215* (2013.01); *G06K 9/6218* (2013.01); *G06T 7/00* (2013.01); *G06T 7/73* (2017.01); *G06T 17/20* (2013.01); *G06K 9/6212* (2013.01); *G06T 15/005* (2013.01); *G06T 2207/10032* (2013.01); *G06T 2207/20221* (2013.01); *G06T 2207/30244* (2013.01); *G06T 2210/52* (2013.01)

(58) Field of Classification Search
None
See application file for complete search history.

(56) References Cited

U.S. PATENT DOCUMENTS

| | | | | |
|---|---|---|---|---|
| 2005/0231751 | A1* | 10/2005 | Wu | ........................ G06F 3/1208 |
| | | | | 358/1.15 |
| 2010/0131499 | A1* | 5/2010 | van Leuken | ........... G06K 9/622 |
| | | | | 707/723 |
| 2017/0193693 | A1* | 7/2017 | Robert | ...................... G06T 7/55 |
| 2019/0095514 | A1* | 3/2019 | Anastassov | ........... G06F 16/355 |

* cited by examiner

Primary Examiner — Weiming He
(74) Attorney, Agent, or Firm — Keller Jolley Preece

(57) ABSTRACT

Systems and methods are disclosed for more efficiently and quickly utilizing digital aerial images to generate models of a site. In particular, in one or more embodiments, the disclosed systems and methods capture a plurality of digital aerial images of a site. Moreover, the disclosed systems and methods can cluster the plurality of digital aerial images based on a variety of factors, such as visual contents, capture position, or capture time of the digital aerial images. Moreover, the disclosed systems and methods can analyze the clusters independently (i.e., in parallel) to generate cluster models. Further, the disclosed systems and methods can merge the cluster models to generate a model of the site.

20 Claims, 14 Drawing Sheets

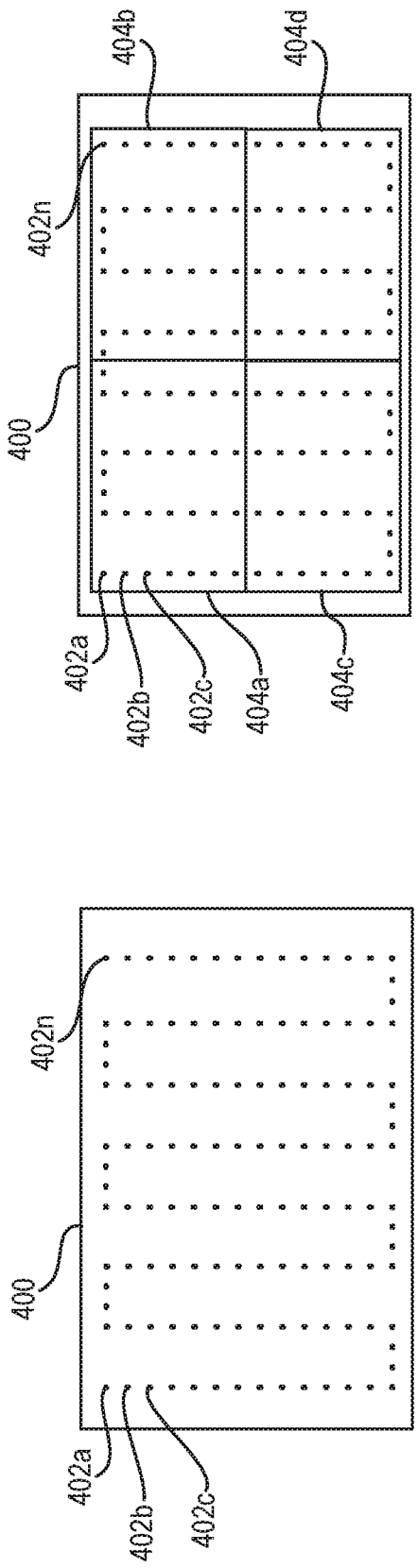
Fig. 4A
Fig. 4B
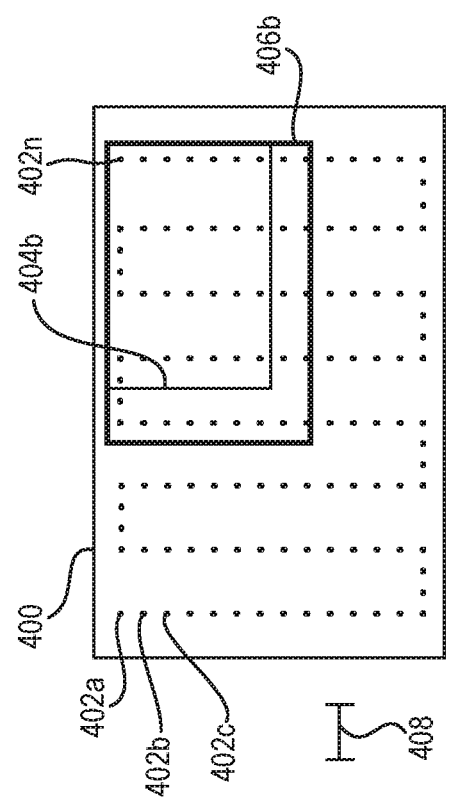
Fig. 4C
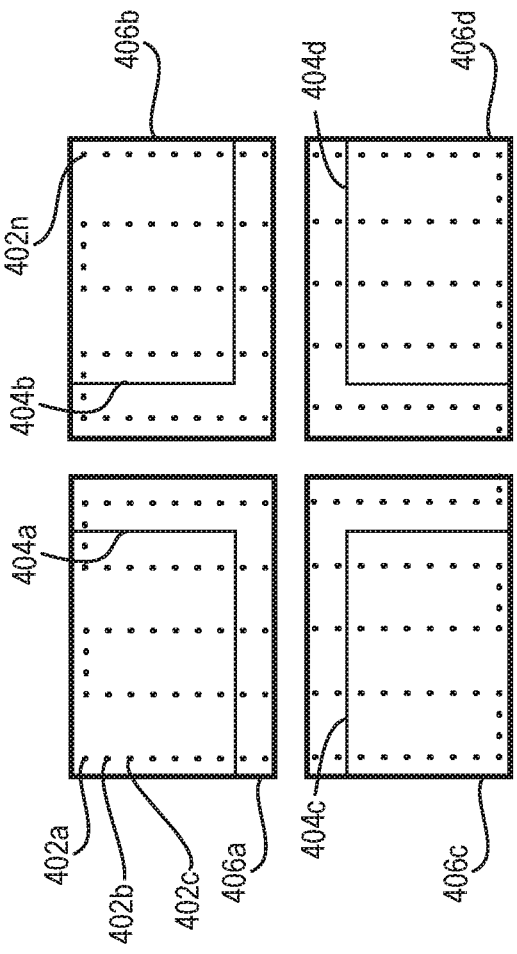
Fig. 4D

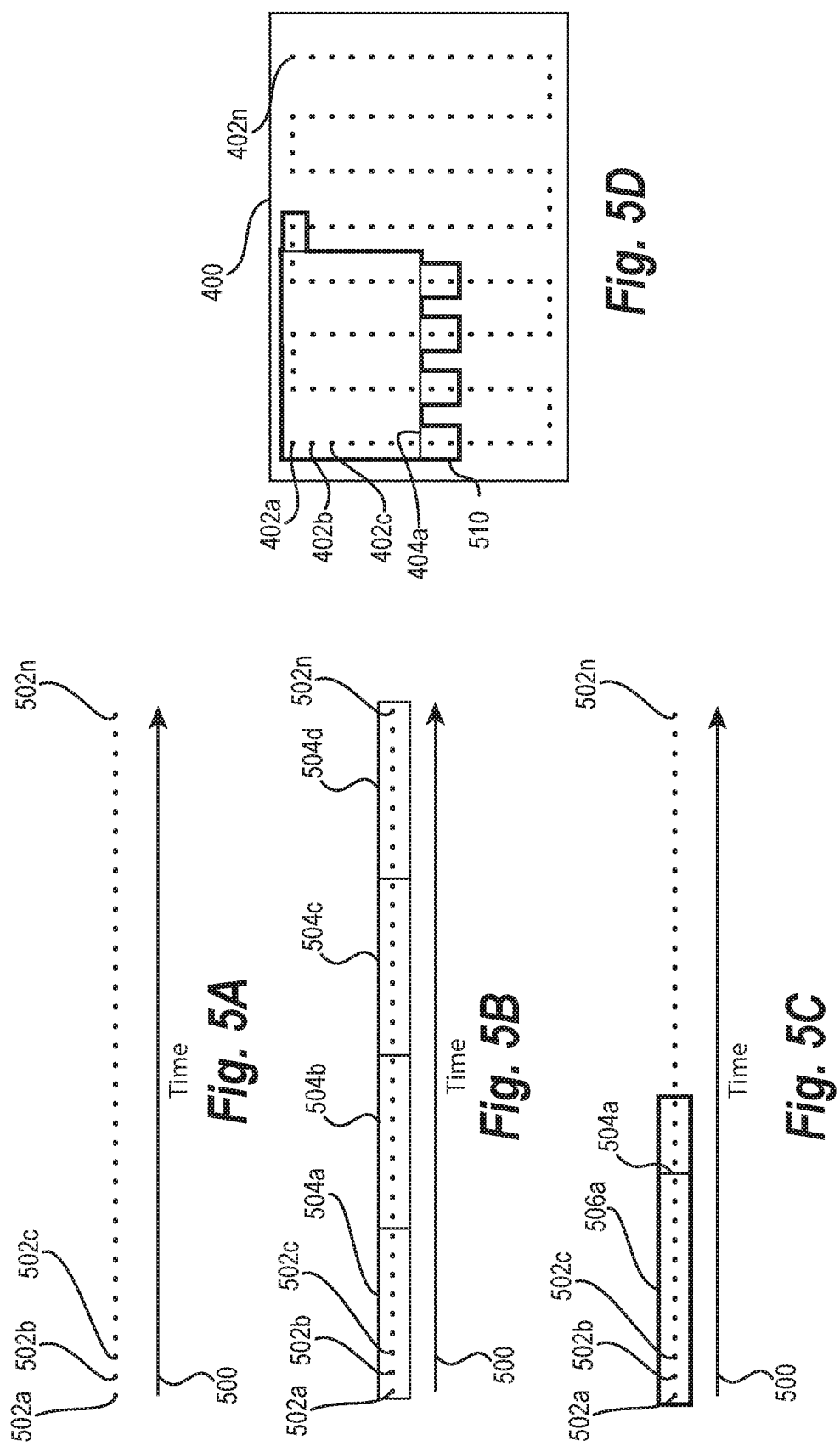

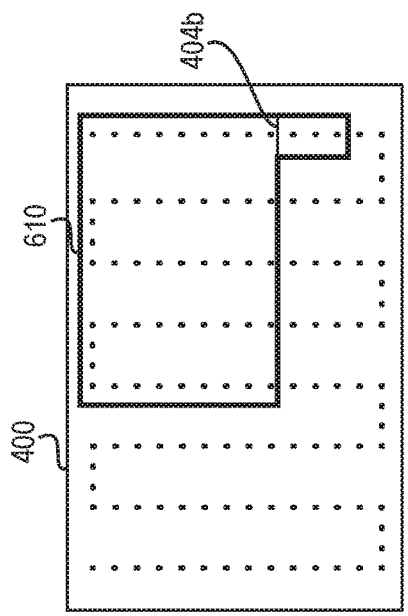
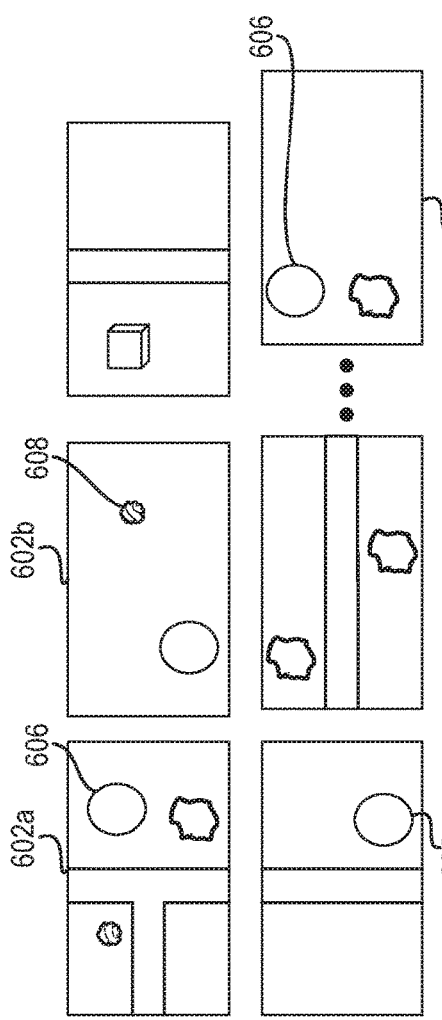
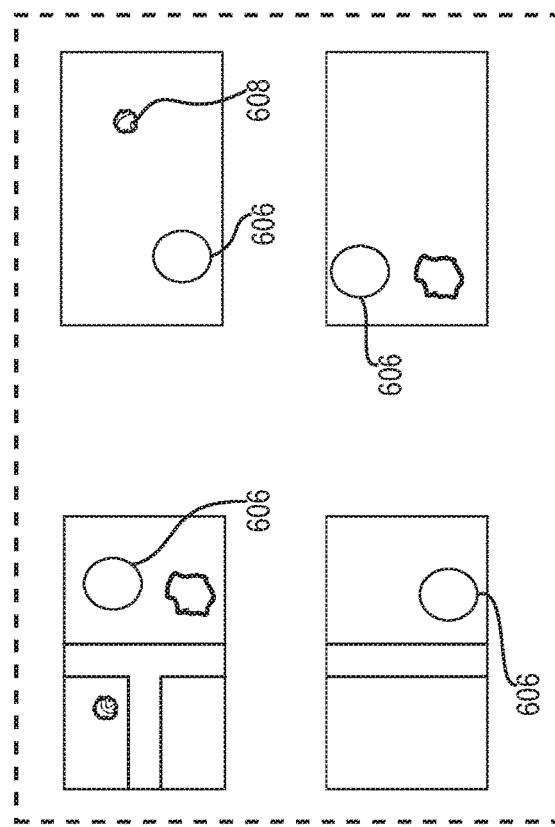

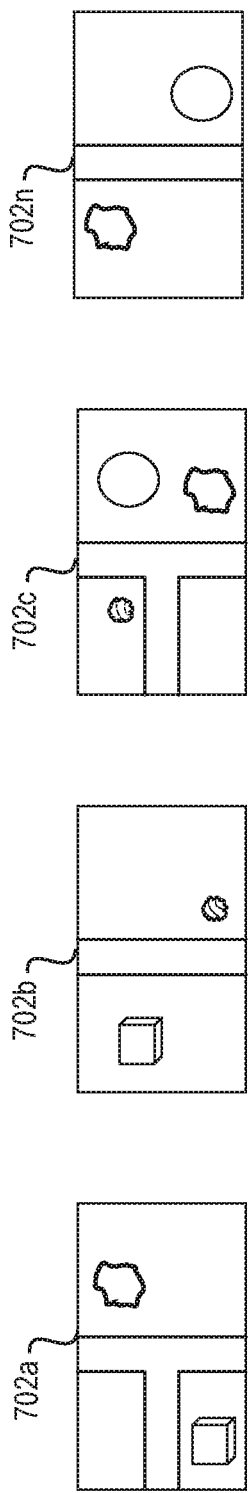
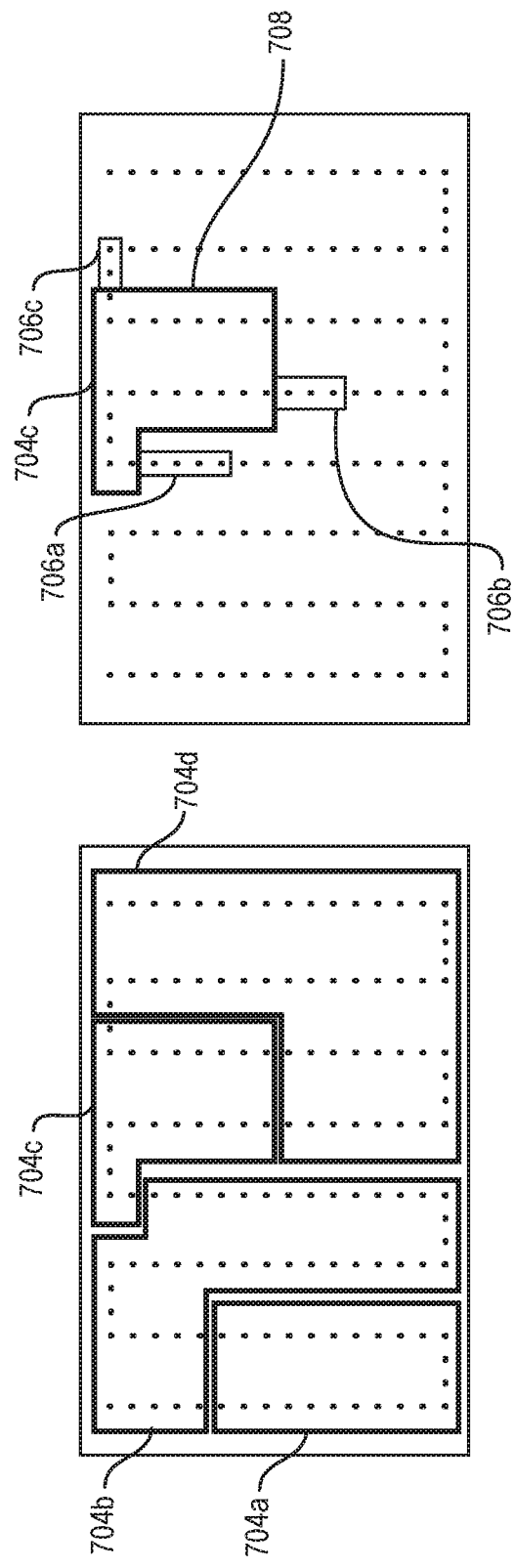
Fig. 7A
Fig. 7B
Fig. 7C

CONVERTING DIGITAL AERIAL IMAGES INTO A THREE-DIMENSIONAL REPRESENTATION UTILIZING PROCESSING CLUSTERS

BACKGROUND

In recent years, individuals and businesses have increasingly turned to UAVs or other unmanned vehicles to capture digital aerial content. Indeed, because of the relatively low cost of UAVs in comparison to conventional aircraft, individuals and businesses can now utilize UAVs to perform flight missions and capture digital aerial images or digital aerial videos of a variety of different ground sites. For example, it is becoming increasingly common to utilize UAVs to capture digital aerial images of sites for construction, land management, mining, activity tracking, or other applications.

In addition, as a result of the increased availability of digital aerial images captured by UAVs, some conventional systems have begun to utilize digital aerial images to generate three-dimensional models. For example, conventional modeling systems can now utilize digital aerial images to generate a model of a construction site, allowing users to evaluate construction progress of structures as they are built.

Although conventional modeling systems can generate three-dimensional models of a site, they also have a number of significant problems. For example, conventional modeling systems can require a significant amount of time and processing power to analyze digital aerial images and generate three-dimensional models of a site. To illustrate, a conventional modeling system utilizing two-hundred digital aerial images of a site can take up to one hour to generate a three-dimensional representation of the site. Many users often express frustration with the amount of time required to generate three-dimensional site models.

Not only do conventional modeling systems require a significant amount of time to generate three-dimensional models of a site, but the amount of time can vary significantly from one application to the next. For instance, the amount of time and processing power required to generate a three-dimensional representation of a site can increase quadratically (or exponentially) as the number of digital aerial images of a site increases. For example, although conventional modeling systems can require up to an hour to generate a three-dimensional representation of a site from two-hundred digital aerial images of the site, conventional modeling systems can require up to twenty hours to generate a three-dimensional representation of a site from two-thousand digital aerial images. The amount, and variability, of time required to generate three-dimensional models from digital aerial images is a significant drawback to conventional modeling systems. Indeed, it is difficult for users to meet processing deadlines when the amount of time required to process a three-dimensional model is not only exorbitant but variable on a per-project basis.

Accordingly, a number of problems and disadvantages exist with conventional systems for generating three-dimensional models utilizing digital aerial images captured by a UAV.

BRIEF SUMMARY

Embodiments of the present disclosure provide benefits and/or solve one or more of the foregoing or other problems in the art with systems and methods for utilizing parallel processing clusters to generate a site model from digital aerial images. In particular, in one or more embodiments, the disclosed systems and methods identify clusters of digital aerial images (e.g., based on a measure of similarity between the digital aerial images) and individually process the clusters in parallel utilizing a network of computing devices. Specifically, the disclosed systems and methods can analyze individual clusters and generate cluster specific models utilizing a network of computing devices. Moreover, the disclosed systems and methods can utilize the cluster specific models to generate a final model of the site. In particular, the disclosed systems and methods can merge the cluster specific models to generate a final site model (e.g., a three-dimensional representation or orthomap of the site that is consistent in the local coordinates of the reconstruction, as with a global georeference).

By generating clusters, analyzing the clusters individually utilizing a plurality of computing devices, and then merging cluster specific models, the disclosed systems and methods can significantly reduce the time required to generate models of a site. Moreover, the disclosed systems and methods can also increase predictability in the time required to generate site models. Indeed, the disclosed systems and methods can divide data from digital aerial images into clusters that require approximately uniform time periods to process. Thus, the disclosed systems and methods can generate site models from digital aerial images in a constant time, regardless of the size of the site or the number of digital aerial images.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

Below is a brief description of the figures referenced in the detailed description.

FIGS. 4A-4D illustrate identifying clusters of digital aerial images utilizing a measure of similarity based on capture position in accordance with one or more embodiments;

FIGS. 5A-5D illustrate identifying clusters of digital aerial images utilizing a measure of similarity based on capture time in accordance with one or more embodiments;

FIGS. 6A-6D illustrate identifying clusters of digital aerial images utilizing a measure of similarity based on visual content portrayed in digital aerial images in accordance with one or more embodiments;

FIGS. 7A-7C illustrates a representation of merging cluster models utilizing a measure of similarity based on multiple factors in accordance with one or more embodiments;

DETAILED DESCRIPTION

Figure 1:
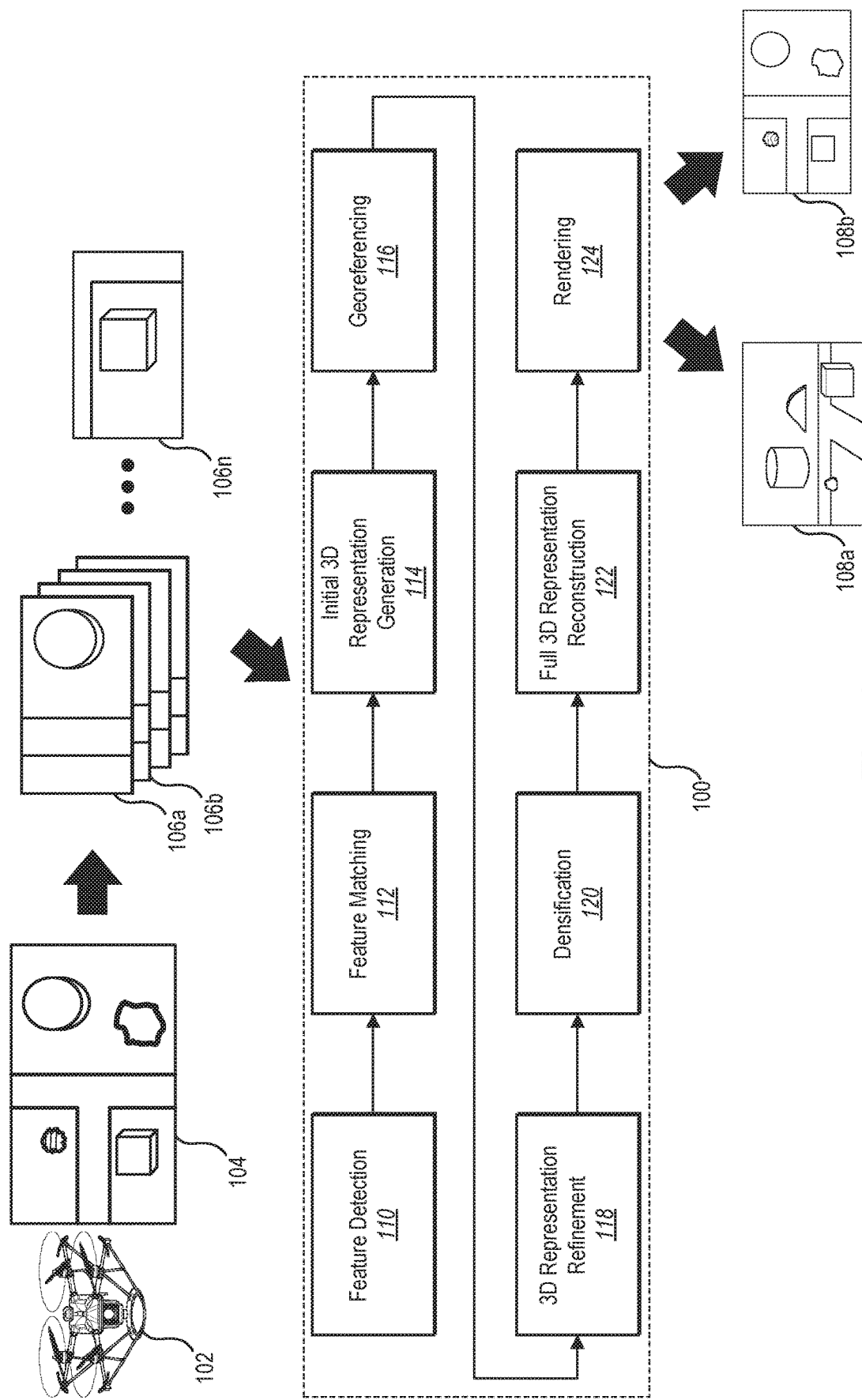
FIG. 1 illustrates a representation of utilizing a UAV to capture digital aerial images of a site and generating a site model utilizing a model generation pipeline in accordance with one or more embodiments.

The present disclosure includes various embodiments and features of a parallel model processing system and corresponding methods that generate clusters from digital aerial images and process the clusters in parallel to generate a site model. In particular, in one or more embodiments the parallel model processing system analyzes data regarding a site (e.g., digital aerial images and/or initial three-dimensional representations) and divides the data into clusters. The parallel model processing system can generate the clusters based on a variety of factors (e.g., various measures of similarity between the digital aerial images), including visual content of the digital aerial images, capture position (i.e., position and/or orientation of a camera when a digital aerial image is captured), and/or capture time. Moreover, in one or more embodiments, the parallel model processing system sends the clusters to a plurality of computing devices (e.g., a cloud computing network that provides virtual computing services). The plurality of computing devices can analyze the clusters independently to generate cluster models (i.e., models corresponding to the individual clusters). Moreover, the parallel model processing system can utilize the cluster models to generate a final model of the site.

To illustrate, in one or more embodiments, the parallel model processing system receives digital aerial images of a site captured by a UAV (or other unmanned vehicle). Moreover, the parallel model processing system determines clusters of the digital aerial images by analyzing, for each digital aerial image, a capture position the digital aerial image. In addition, the parallel model processing system sends the clusters of the digital aerial images to a plurality of computing devices for generating cluster models. Furthermore, the parallel model processing system generate a model of the site by merging the cluster models.

The parallel model processing system provides a number of advantages over conventional modeling systems. For instance, in identifying and utilizing clusters, the parallel model processing system can quickly and efficiently divide data (i.e., digital aerial images, three-dimensional representations, or other data) into manageable clusters. Moreover, the parallel model processing system can send the clusters to a plurality of computing devices for individual processing, thus, reducing the processing time and burden on any individual computing device. Further, the parallel model processing system can then merge data from the plurality of computing devices to generate a consistent model of the site.

In this manner, the parallel model processing system can significantly reduce the overall time required to generate site models when compared with conventional systems.

Furthermore, in one or more embodiments, the parallel model processing system generates and merges clusters in a manner that controls the time required to generate site models. For example, the parallel model processing system can manage what steps or acts to perform at a cloud computing network (as opposed to at a local computing device), can manage the size of clusters, and can manage the amount of overlap between clusters. Thus, the parallel model processing system can control the amount of time required to generate site models and reduce variability in processing time. Accordingly, the parallel model processing system can provide accurate site models from a plurality of digital aerial images in reduced and predictable periods of time.

As mentioned above, in one or more embodiments, the parallel model processing system generates a model of a site from a plurality of digital aerial images. In particular, the parallel model processing system can utilize a model generation pipeline that includes a variety of analytical acts for producing a site model. For instance, the parallel model processing system can utilize a model generation pipeline that detects and matches features between digital aerial images, generates an initial three-dimensional representation based on the matched features, determines and applies georeference information, refines the three-dimensional model, generates additional three-dimensional points through densification, and/or reconstructs a full three-dimensional model. In other words, the parallel model processing system can perform a variety of acts in a model generation pipeline to generate a site model, such as a three-dimensional representation or orthomap.

As mentioned above, the parallel model processing system can generate clusters and send the clusters to a plurality of computing devices for parallel (i.e., independent, simultaneous) processing. The parallel model processing system can generate clusters and send the clusters to a plurality of computing devices at various transition points in performing a model generation pipeline to reduce time and increase reliability in generating a site model. For example, in one or more embodiments, the parallel model processing system can identify clusters of digital aerial images upon receiving the digital aerial images, after an act of feature detection, or after an act of feature matching. Similarly, the parallel model processing system can also generate clusters after generating an initial model of a site (e.g., after generating an initial three-dimensional representation, after georeferencing an initial three-dimensional representation, or after refining a three-dimensional representation). For example, in one or more embodiments, the parallel model processing system generates an initial three-dimensional model of a site and then generates clusters from the initial three-dimensional model.

The parallel model processing system can generate clusters of digital aerial images based on a variety of factors. For example, in one or more embodiments, the parallel model processing system generates clusters based on a measure of similarity between digital aerial images. The parallel model processing system can determine the measure of similarity, and generate clusters from a plurality of digital images, based on, for example, visual content, capture position, and/or capture time. To illustrate, the parallel model processing system can extract visual features from visual content portrayed in a digital aerial image and analyze the visual features to determine a measure of similarity between the digital aerial images. The parallel model processing system can then generate the clusters based on the measure of similarity. For example, the parallel model processing system can apply a graph partitioning algorithm to the measure of similarity and divide the digital aerial images into clusters based on the resulting partition.

Upon generating clusters, the parallel model processing system can send the clusters to a plurality of computing devices (i.e., a network of computers capable of analyzing the clusters in parallel). Moreover, the parallel model processing system can utilize the plurality of computing devices to analyze the individual clusters. For example, the parallel model processing system can analyze a cluster of digital aerial images to detect features within the cluster, match features within the cluster, and generate an initial cluster three-dimensional representation. Similarly, the parallel model processing system can utilize a plurality of computing devices to analyze a cluster three-dimensional representation by applying georeference information or refining the clustered three-dimensional representation.

Upon analyzing clusters, the parallel model processing system can also merge the analyzed clusters. For example, the parallel model processing system can merge a cluster of digital aerial images or cluster three-dimensional models to generate a final three-dimensional model. To illustrate, in one or more embodiments, the parallel model processing system identifies common points or features across different cluster three-dimensional representations and utilizes the common points or features to merge the cluster three-dimensional representations.

To aid in merging, in one or more embodiments, the parallel model processing system generates clusters such that the clusters have common data points. For example, the parallel model processing system can generate clusters of digital aerial images such that each cluster has common digital aerial images. Similarly, the parallel model processing system can generate clusters of three-dimensional data points such that each cluster has common three-dimensional data points.

To illustrate, in one or more embodiments, the parallel model processing system generates an initial group (i.e., an initial group of digital aerial images or an initial group of three-dimensional data points) and then expands the initial group to generate a cluster with common data points. For example, the parallel model processing system can expand an initial group based on position, time, digital aerial image contents, and/or other factors. By expanding an initial group to generate a cluster, the parallel model processing system can generate cluster models with common data points that can be more easily merged (e.g., more quickly and more accurately merged to generate a precise digital model).

As mentioned above, the parallel model processing system can cluster and merge data at variety of transition points of a model generation pipeline in generating a site model. Furthermore, in one or more embodiments, the parallel model processing system selects what acts to perform at various transition points. Specifically, the parallel model processing system can determine what acts to perform at a client device and what acts to perform at a plurality of computing devices to efficiently and quickly perform acts of a model generation pipeline.

As used herein, the term "UAV" or "unmanned aerial vehicle" refers to an aircraft that can be piloted autonomously or remotely by a control system. A UAV may include any type of unmanned aircraft, including a micro UAV, low altitude UAV, or high altitude UAV, whether autonomously or remotely piloted. Moreover, a UAV may include a multi-rotor UAV, single-rotor UAV, blimp UAV, or other types of UAVs. In one or more embodiments, a UAV comprises a camera and/or GPS receiver affixed to the UAV.

As used herein, the term "unmanned vehicle" refers to a vehicle with one or more components operated autonomously or remotely. For example, an unmanned vehicle includes a terrestrial vehicle (e.g., a car, truck, or construction vehicle such as a backhoe, excavator, or crane) that can be moved autonomously or remotely. Although many of the features of the parallel model processing system are described herein in relation to a UAV, the parallel model processing system can also utilize an unmanned vehicle to perform such functions. For example, the parallel model processing system can capture digital aerial images via a camera affixed to an unmanned vehicle (e.g., a camera affixed to an elevated portion of a crane).

As used herein, the term "digital aerial image" refers to any digital symbol, picture, icon, or illustration captured by a camera elevated from the ground (whether via conventional digital cameras, infrared cameras or devices configured to capture other wavelengths or channels). For example, the term "digital aerial image" includes a digital picture captured by a camera affixed to a UAV in flight. Similarly, the term "digital aerial image" includes a digital picture captured by a camera affixed to a crane (or other construction vehicle). The term "digital aerial image" includes digital files with the following, or other, file extensions: JPG, TIFF, BMP, PNG, RAW, or PDF. The term "digital aerial image" also includes one or more images (e.g., frames) in a digital aerial video (e.g., a digital video captured from a UAV in flight).

As used herein, the term "site" refers to a location on Earth. In particular, the term site includes a location on Earth visible from a UAV in flight. The term site can include a construction site, a mining site, a property, a wilderness area, a disaster area, or other location.

As used herein the term "model" refers to digital data depicting all or a portion of an object. In particular, the term "model" refers to digital data reflecting all or a portion of a site. The term model can include a three-dimensional representation or a two-dimensional representation. As used herein, the term "three-dimensional representation" includes a model with three-dimensional data (e.g., data describing a location of one or more points in three dimensions). In particular, a three-dimensional representation includes a three-dimensional point cloud, a three-dimensional mesh, or a three-dimensional surface reflecting all or a portion of a site. To illustrate, the term three-dimensional site representation includes a three-dimensional point cloud derived from the observation of a site from multiple views (e.g., an initial three-dimensional model, a refined three-dimensional model, and/or a final three-dimensional model described below).

As just mentioned, the term "model" can also include a two-dimensional representation. For example, the term "model" also includes a two-dimensional representation of a site, such as an orthomap. As used herein, the term "orthomap" (or "orthophoto") refers to a geometrically corrected aerial image portraying a uniform scale. In particular, an orthomap can comprise a geometrically corrected aerial image where the effects of tilt and relief have been removed. Because an orthomap portrays a uniform scale, it is possible to measure distances directly from an orthomap. For example, a construction manager can utilize an orthomap of a construction site to accurately measure the distance between objects appearing on the orthomap.

As used herein, the term "cluster" refers to a subset of digital data. In particular, the term "cluster" refers to a subset of digital data reflecting a site. For example, the term "cluster" can include a subset of a plurality of digital images of a site. Similarly, the term "cluster" can include a subset of a three-dimensional representation of a site (e.g., a subset of points from a three-dimensional point cloud of a site). Moreover, the term "cluster" can include a subset of data corresponding to a site generated from digital aerial images or a three-dimensional representation. For example, the term "cluster" can include a subset of features (e.g., features of a subset of digital aerial images), descriptors (e.g., descriptors of a subset of digital aerial images), or georeference information (e.g., real-world location information corresponding to one or more points of a model). As mentioned, clusters may be generated utilizing a graph partitioning algorithm. Accordingly, the term "cluster" includes a partition resulting from a graph partitioning algorithm.

As used herein, the term "cluster model" refers to a model generated from a cluster. In particular, the term "cluster model" refers to a model generated by a single cluster. For example, a cluster model includes a model generated from a cluster of digital aerial images. Similarly, the terms "cluster three-dimensional representation" or "cluster orthomap" refer to a three-dimensional representation or an orthomap generated by a single cluster.

As used herein, the term "measure of similarity" refers to an indicator, value, calculation, computation quantity, and/or degree of connection and/or correspondence between at least two items. In particular, the term "measure of similarity" includes a computation of likeness between two digital aerial images. As mentioned above, a measure of similarity can rest on one or more of a variety of factors, including capture time, capture position, and/or visual content. For example, a measure of similarity includes values utilized by a graph partition algorithm and/or clustering algorithm to group digital aerial images into clusters. Thus, a measure of similarity includes a value utilized to determine edges in a graph partition algorithm.

As used herein, the term "capture position" refers to a location and/or orientation of a camera when capturing a digital aerial image. In particular, the term "camera position" includes coordinates of the camera at the time the camera captures a digital aerial image. The term "camera position" also includes roll, pitch, and/or yaw of the camera at the time of capturing a digital aerial image. Thus, capture position can also include a measure of where a camera is located as well as where a camera is pointed at the time a digital aerial image is captured.

As used herein, the term "visual content" refers to any visual component of a digital aerial image. In particular, the term "visual content" includes a visual component displayed in a digital aerial image. For example, the term "visual content" includes one or more pixels of a digital image. Moreover, the term "visual content" includes an object portrayed in a digital aerial image (e.g., a structure, vehicle, person, or rock).

As used herein the term "visual feature" refers to a representation of visual content portrayed in a digital image. Visual features can include a representation of visual content generated by a classifier, machine learning algorithm, object recognition algorithm, and/or neural network utilized to compare digital images. For example, in one or more embodiments, visual features comprise visual words utilized by a bag of words algorithm to compare digital aerial images. Similarly, in one or more embodiments, visual features include an object identified (or segregated) from within a digital aerial image (e.g., an object identified by a classification algorithm). Moreover, in one or more embodiments, visual features includes a representation of pixels, such as a histogram of pixel colors, portrayed in a digital aerial image. In yet other embodiments, the term "visual features" includes a feature vector (e.g., a feature vector generated by a neural network or other machine learning algorithm for representing visual content of a digital aerial image).

As used herein, the term "capture time" refers to a time when a digital aerial image is captured. In particular, the term "capture time" includes a time (or period of time) when a camera captures light rays reflecting a site and generates a digital aerial image. Similarly, as used herein, the term "capture position" refers to a location of a camera when a digital aerial image is captured. In particular, the term "capture position" includes coordinates of a camera when the camera captures light rays reflecting a site and generates a digital aerial image.

Turning now to FIG. 1, additional detail will be provided regarding generating a site model from a plurality of digital aerial images in accordance with an example embodiment of the parallel model processing system. In particular, FIG. 1 illustrates a plurality of acts in a model generation pipeline 100 utilized by the parallel model processing system to generate a site model from digital aerial images.

More specifically, FIG. 1 illustrates a UAV 102 and a site 104. As shown, the UAV 102 conducts a flight over the site 104 and captures a plurality of digital aerial images 106a-106n. The parallel model processing system provides the digital aerial images 106a-106n to one or more computing devices for execution of the model generation pipeline 100 and generation of a site model (i.e., a three-dimensional mesh 108a and/or an orthomap 108b).

As shown, the model generation pipeline 100 comprises a plurality of acts 110-124. Although not shown, in one or more embodiments, the acts 110-124 are performed by one or more computing devices. In particular, as discussed in more detail below, in one or more embodiments, the parallel model processing system comprises computer-executable instructions that, when executed by one or more computing devices cause the one or more computing devices to perform the acts 110-124 shown in FIG. 1.

As illustrated in FIG. 1, the model generation pipeline 100 comprises an act 110 of feature detection. In particular, the act 110 can comprise detecting features of the plurality of digital aerial images 106a-106n that can ultimately be matched across digital aerial images (e.g., to estimate depth information). More particularly, in one or more embodiments, the act 110 includes detecting keypoints from the plurality of digital aerial images 106a-106n so that the keypoints can be compared across the digital aerial images 106a-106n to determine depth (e.g., elevation) of points portrayed in the digital aerial images 106a-106n. Specifically, the act 110 can include determining keypoints and corresponding descriptors of the plurality of digital aerial images.

The parallel model processing system can utilize a variety of algorithms or approaches to perform the act 110. For example, in one or more embodiments, the parallel model processing system utilizes a SIFT (scale-invariant feature transform) algorithm to detect features of the plurality of digital aerial images 106a-106n. Similarly, the parallel model processing system can also utilize an ORB (oriented FAST and rotated BRIEF) algorithm, AKAZE algorithm, or LIOP (local intensity order pattern) algorithm to detect features (i.e., keypoints and descriptors) from the plurality of digital aerial images 106a-106n.

As shown in FIG. 1, the model generation pipeline 100 also comprises an act 112 of feature matching. In particular, the act 112 can include matching features of the digital aerial images 106a-106n. For example, the act 112 can include detecting common keypoints between images in the plurality of digital aerial images 106a-106n. More particularly, the act 112 can include detecting common descriptors (i.e., descriptors identified in the act 110) between images in the plurality of digital aerial images 106a-106n.

The parallel model processing system can utilize a variety of approaches or algorithms to perform the act 112. For example, in one or more embodiments, the parallel model processing system utilizes an ANN (approximate nearest neighbor) algorithm to match features from the plurality of digital aerial images 106a-106n. The parallel model processing system can also utilize other approaches, such as a cascade hashing matching algorithm, NNDR (nearest neighbor distance ratio) algorithm, fixed threshold comparison algorithms, or brute force algorithms.

As shown in FIG. 1, the model generation pipeline 100 can also include an act 114 of initial three-dimensional representation generation. The act 114 can include computing an initial structure from the matching data. In particular, the act 114 can include computing initial camera poses (e.g., camera position) and/or three-dimensional points based on matching keypoints from the plurality of digital aerial images 106a-106n (e.g., based on matching features identified in the act 112). Specifically, the parallel model processing system can determine camera poses (and three-dimensional points of the site) based on the intersection of the matching keypoints from multiple viewpoints in the plurality of digital aerial images 106a-106n. In one or more embodiments, the act 114 generates a sparse point cloud comprising a plurality of three-dimensional points.

The parallel model processing system can utilize a variety of approaches or algorithms to perform the act 114. For example, the act 114 can comprise applying a structure from motion algorithm to the plurality of digital aerial images 106a-106n utilizing matching features identified in the act 112. To illustrate, the act 114 can comprise an incremental structure from motion algorithm, a global structure from motion algorithm, or an out-of-core structure from motion algorithm. In this manner, the parallel model processing system can calculate the relative position of cameras where the plurality of digital aerial images 106a-106n were taken. The parallel model processing system can also determine initial relative three-dimensional points of the site.

As shown in FIG. 1, the model generation pipeline 100 can also include an act 116 of georeferencing. In particular, the act 116 can include georeferencing and triangulation of the initial three-dimensional representation generated in the act 114. As used herein, the term "georeference" or "georeferencing" refers to generating information (i.e., georeference information) that relates data to a known location relative to the Earth. In particular, georeferencing can relate all or a portion of an image or three-dimensional representation to coordinates relative to the Earth based on a coordinate system. For example, georeference information can include information relating an image feature (or other part of an image) to a latitude, longitude, township, range, section, quarter section, quarter-quarter section, meridian, baseline, arpent, site reference, local reference, or other coordinate system or reference.

To illustrate, the act 116 can include generating a transform between the initial three-dimensional representation generated in the act 114 and ground truth coordinates of the Earth. More particularly, the act 116 can include generating a transform that modifies rotation, scaling, and translation of data points within an unreferenced three-dimensional representation (e.g., a point cloud) to relate the data points to corresponding geographic locations on the Earth. For example, the act 116 can include utilizing a Helmert transformation to map a three-dimensional point cloud with a first rotation, first scaling and first translation in a first coordinate system to a second rotation, second scaling, and second translation in a coordinate system relative to the Earth.

In addition to georeferencing, the model generation pipeline 100 can also include an act 118 of three-dimensional representation refinement. In particular, the act 118 can comprise refining the three-dimensional representation based on one or more accuracy sources. For example, the act 118 can comprise optimizing the three-dimensional representation based on ground control points (i.e., points placed on the ground at a known location), GPS (i.e., GPS data reflecting position of a camera utilized to capture the plurality of digital aerial images 106a-106n), PPP data (i.e., precise point positioning data), or RTK data (i.e., real-time kinematic network data that, in conjunction with satellite readings, allows the parallel model processing system to determine positions of a camera utilized to capture the plurality of digital aerial images 106a-106n). To illustrate, the act 118 can include solving an optimization problem for camera poses, camera intrinsics, and three-dimensional points based on the accuracy source and matching features.

The parallel model processing system can utilize a variety of algorithms or approaches to perform the act 118. For example, in one or more embodiments, the parallel model processing system utilizes a bundle adjustment algorithm. Indeed, in one or more embodiments, the parallel model processing system utilizes the Levenberg-Mardquart algorithm to solve camera poses, camera intrinsics, and three-dimensional points of the site.

As shown in FIG. 1, the model generation pipeline 100 can also include the act 120 of densification (or multiview stereo). In particular, the act 120 can include generating additional three-dimensional points to a three-dimensional model. Specifically, the act 120 can include generating additional detail and retrieving additional three-dimensional points for better estimation and modeling of the site. For example, after determining camera extrinsics and camera intrinsics, the parallel model processing system can analyze the plurality of digital aerial images 106a-106n and generate additional three-dimensional points. Thus, the act 120 can comprise generating a dense point cloud from a sparse point cloud (i.e., from the act 116 and/or the act 118). As briefly mentioned, in addition to utilizing a sparse point cloud, the act 120 can also include dense stereo matching.

As shown in FIG. 1, the model generation pipeline 100 can also include the act 122 of full three-dimensional representation reconstruction. For example, the act 122 can comprise a full surface reconstruction, such as generating a three-dimensional mesh. In particular, the act 122 can comprise generating a three-dimensional mesh from a three-dimensional point cloud (i.e., a densified three-dimensional point cloud from the act 120). The parallel model processing system can utilize a variety of approaches or algorithms the perform the act 122. For example, in one or more embodiments, the parallel model processing system utilizes a Poisson Reconstruction algorithm or a Smooth Signed Distance algorithm.

The act 122 can also include texture mapping. In particular, the act 122 can include mapping undistorted images to a three-dimensional model. For instance, the act 122 can include mapping the digital aerial images 106a-106n to a three-dimensional mesh to add detail (e.g., color, texture, or other surface detail) to the three-dimensional reconstruction.

Moreover, as illustrated in FIG. 1, the model generation pipeline 100 can also include the act 124 of rendering. In particular, the act 124 can comprise rendering a visual depiction of a site model. For instance, the act 124 can comprise providing a model of a site for display via a display screen of a computing device. The parallel model processing system can render a variety of different models. For instance, as shown in FIG. 1, the act 124 can comprise rendering the three-dimensional mesh 108a. Moreover, the act 124 can comprise rendering the orthophoto 108b.

Accordingly, by applying the model generation pipeline 100 the parallel model processing system can convert the plurality of digital aerial images 106a-106n to a model of the site. In particular, the parallel model processing system can generate the three-dimensional mesh 108a and/or the orthomap 108b.

Although FIG. 1 illustrates a particular sequence of the acts 110-124 in the model generation pipeline 100, the particular acts described in relation to FIG. 1 are intended to be illustrative of one or more methods in accordance with the present disclosure, and are not intended to limit potential embodiments. Alternative embodiments can include additional, fewer, or different acts or processes than those articulated in FIG. 1.

For example, although FIG. 1 illustrates the act 124 of rendering, in one or more embodiments, the parallel model processing system does not perform the act 124. In particular, the parallel model processing system can generate a full three-dimensional representation (at the act 122), and omit the act 124. Similarly, although FIG. 1 illustrates the act 116 of georeferencing, in one or more embodiments, the parallel model processing system generates a site model without georeferencing (i.e., generate a site model that is not represented in real-world coordinates).

Furthermore, the steps/acts described herein may be performed in a different order, may be repeated or performed in parallel with one another, or may be performed in parallel with different instances of the same or similar steps/acts. For example, although FIG. 1 illustrates the act 116 of georeferencing after the act 114, in one or more embodiments, the parallel model processing system performs the act 116 of georeferencing after the act 120 of densification.

As mentioned above, although performing the model generation pipeline 100 can generate a site model from the plurality of digital aerial images 106a-106n, the model generation pipeline can require a significant amount of time to perform by a single computing device. Furthermore, the processing power and time required to perform each of the acts 110-124 can vary significantly. Indeed, the complexity and time required to perform the acts 110, 112, 116, and 120 increase nearly linearly with regard to the number of digital aerial images. Moreover, the complexity and time required to perform the acts 114, 118 often increase more than linearly (e.g., quadratically) with respect to the number of digital aerial images. Furthermore, the complexity and time required to perform the acts 122, 124 generally increase proportionate to the size of the resulting site model (i.e., the size of a three-dimensional representation of the site).

As a result, processing the plurality of digital aerial images 106a-106n utilizing a single device (or as a single group) can result in a significant amount of processing time as well as wide variability in processing time across different projects. Accordingly, as mentioned above, in one or more embodiments, the parallel model processing system generates clusters (i.e., clusters of uniform size) and utilizes a plurality of computing devices to analyze the clusters individually. In particular, the parallel model processing system can execute various acts of the model generation pipeline 100 with regard to individual clusters utilizing a plurality of computing devices. Thereafter, the parallel model processing system can merge the analyzed clusters to generate a final site model.

Figure 2A:
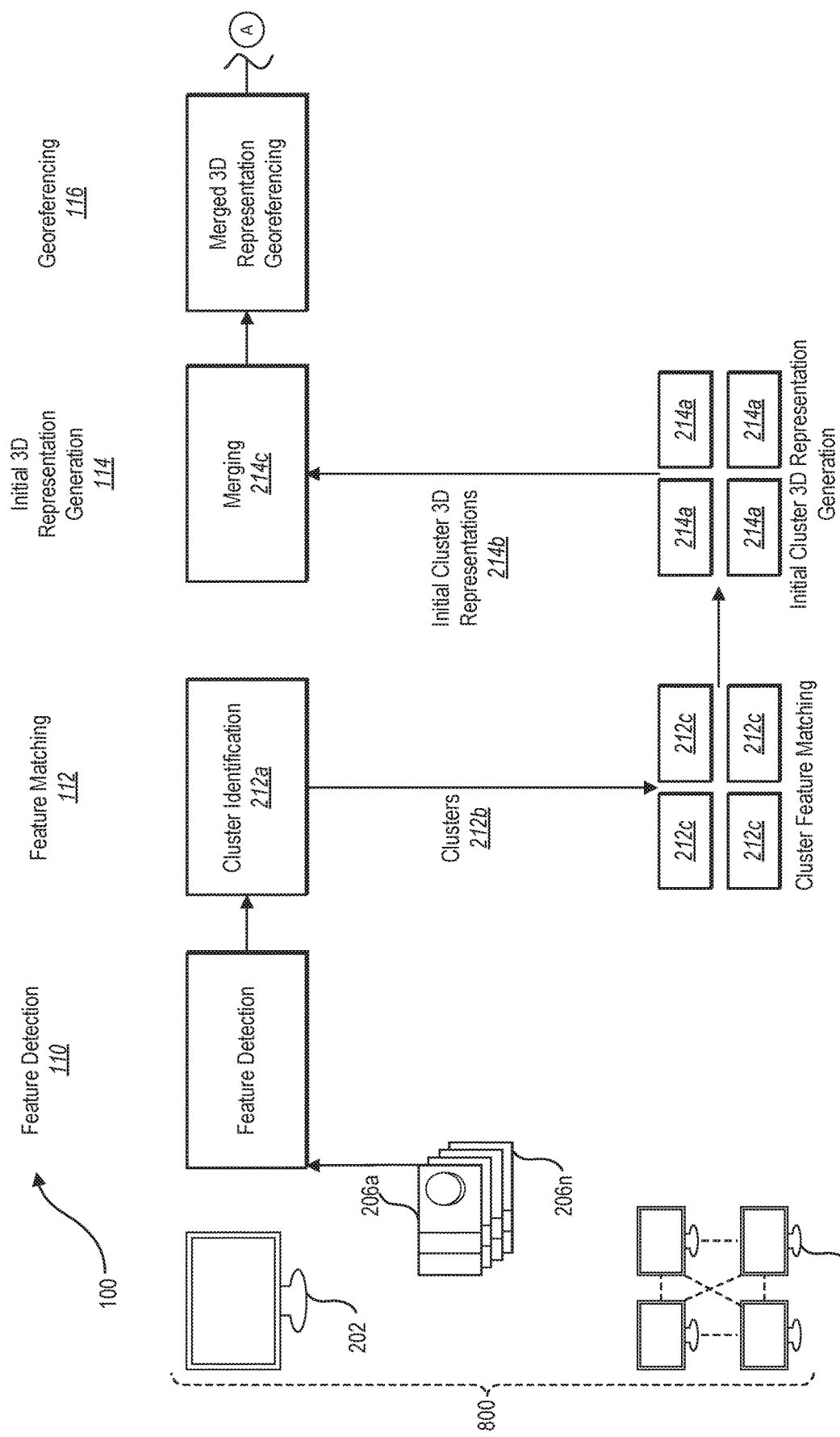
FIGS. 2A-2B illustrate a flowchart of acts in generating a site model in accordance with one or more embodiments.
Figure 2B:
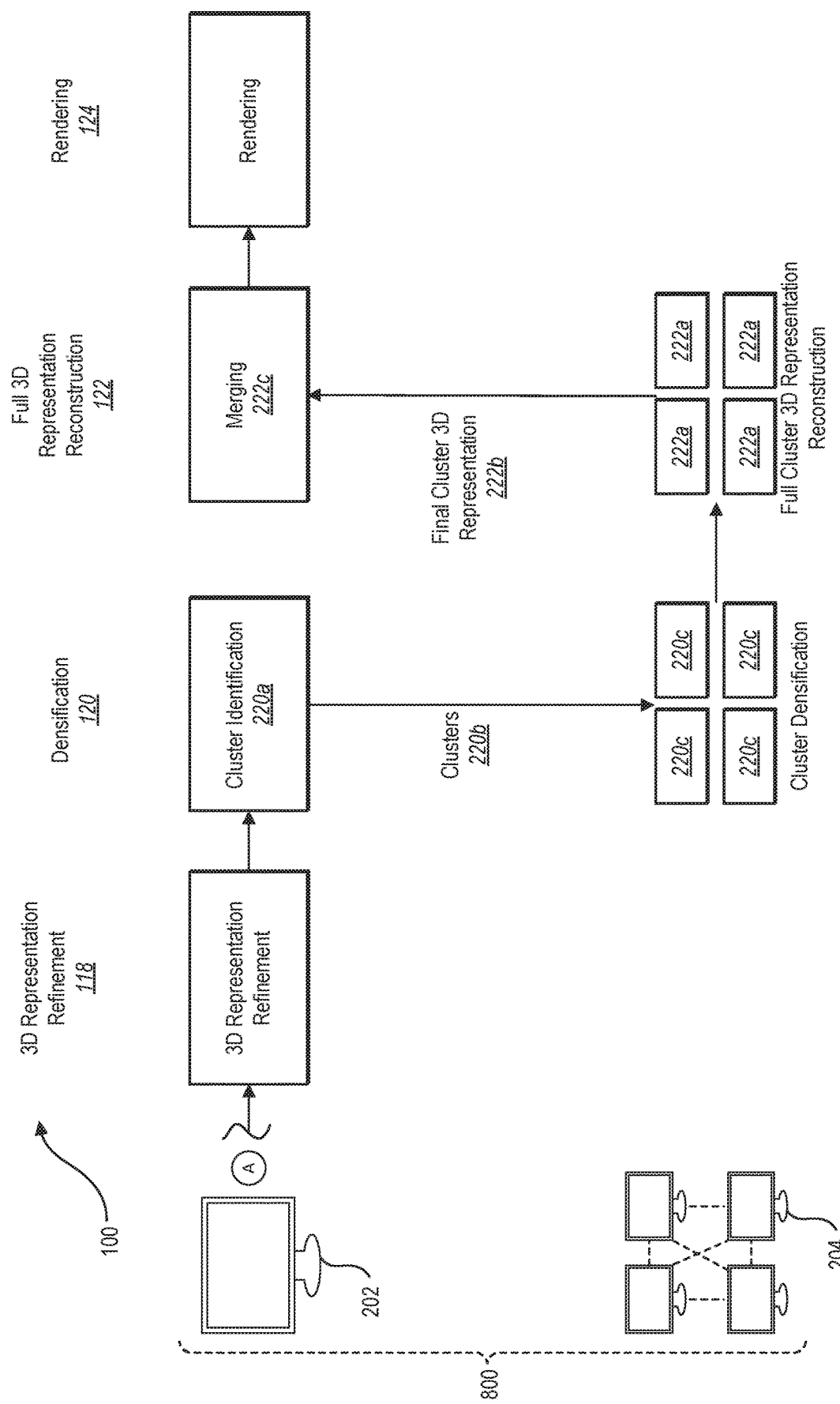

For example, FIGS. 2A-2B illustrate generating clusters, analyzing clusters utilizing a plurality of computing devices, and merging clusters in accordance with an exemplary embodiment of a parallel model processing system 800 (i.e., an exemplary embodiment of the parallel model processing system discussed above). In particular, FIGS. 2A-2B illustrate the parallel model processing system 800 generating a site model from a plurality of digital aerial images 206a-206n utilizing a client device 202 and a plurality of computing devices 204. Specifically, as shown, the parallel model processing system 800 performs the model generation pipeline 100 via the client device 202 and the plurality of computing devices 204 by generating and merging clusters based on the plurality of digital aerial images 206a-206n.

As discussed in more detail below, the parallel model processing system 800 can comprise computer-executable instructions that, when executed by the client device 202 and/or the plurality of computing devices 204 cause the client device 202 and/or the plurality of computing devices 204 to perform the acts 110-124. Furthermore, the client device 202 and the plurality of computing devices 204 may include any type of computing device (e.g., a computing device described below in relation to FIG. 11). For example, the client device 202 and/or the plurality of computing devices 204 may comprise one or more personal computers, laptop computers, or tablets.

In one or more embodiments, the client device 202 and the plurality of computing devices 204 reside in the same location. For example, the parallel model processing system 800 can utilize the client device 202 as a terminal computer that receives user input from one or more users and utilize the plurality of computing devices 204 as a local parallel processing network for analyzing complex data.

In other embodiments, the plurality of computing devices 204 are remote from the client device 202. For example, a client can utilize the client device 202 locally and then transmit data remotely to the plurality of computing devices 204. To illustrate, the plurality of computing devices 204 can comprise a third-party cloud computing system that provides computer processing services. For instance, in one or more embodiments, the plurality of computing devices 204 comprise cloud virtual servers that allow clients to rent virtual computers (i.e., computer processing capabilities) on which the client can run their own applications. For example, the plurality of computing devices 204 can comprise Amazon Elastic Compute Cloud (EC2), Google Compute Engine, Microsoft Azure, Rackspace Cloud, or other cloud computing platforms.

As shown in FIG. 2A, the parallel model processing system 800 can utilize the client device 202 and the plurality of computing devices 204 in conjunction to perform the acts 110-124. In particular, in relation to the embodiment of FIG. 2A, the parallel model processing system 800 identifies a plurality of digital images 206a-206n (i.e., digital aerial images of a site) and provides the plurality of digital aerial images 206a-206n to the client device 202. Moreover, the client device 202 performs the act 110 of feature detection (as described above) in relation to the plurality of digital aerial images 206a-206n.

As shown in FIG. 2A, after feature detection the parallel model processing system 800 utilizes the plurality of computing devices 204 to perform the act 112 of feature matching. Specifically, the client device 202 performs the act 212a of cluster identification, the client device 202 performs the act 212b of sending the clusters to the plurality of computing devices 204, and the plurality of computing devices 204 perform the act 212c of cluster feature matching.

As mentioned above, the parallel model processing system 800 can generate clusters based on digital aerial images in a variety of ways. For example, the parallel model processing system 800 can generate clusters utilizing a measure of similarity based on visual content, based on capture position (i.e., position of a camera that captured the digital aerial images), and/or based on capture time. In particular, the parallel model processing system 800 can apply a clustering algorithm or graph partitioning algorithm that utilize a measure of similarity to identify clusters based on visual content, capture position and/or capture time. For example, the parallel model processing system 800 can analyze visual features of digital aerial images and identify clusters of digital aerial images with similar visual features (e.g., portraying similar objects, visual words, similar feature histograms, or having similar pixel histograms). Additional detail regarding generating clusters of digital aerial images will be provided below (e.g., in relation to FIG. 4).

In relation to the embodiment of FIG. 2A, the parallel model processing system 800 performs the act 212a by identifying clusters based on capture position of the digital aerial images 206a-206n. In particular, the parallel model processing system 800 determines a capture position for each of the plurality of digital aerial images 206a-206n. For example, the parallel model processing system 800 can access location data (e.g., GPS data and/or RTK network) and/or orientation data (e.g., yaw, pitch, and/or roll) for a UAV flight. The parallel model processing system 800 can analyze the location data and/or the orientation data and determine the position (i.e., location and/or orientation) of the UAV when each of the plurality of digital aerial images was captured (e.g., by comparing the location data and/or the orientation data with capture time identified by a camera affixed to the UAV). Thus, the parallel model processing system 800 can determine a capture position for each of the plurality of digital aerial images 206a-206n.

Upon determining the capture position, the parallel model processing system 800 generates the clusters based on the capture position. The parallel model processing system 800 can apply a variety of approaches or algorithms to generate the clusters based on capture position. For example, in one or more embodiments, the parallel model processing system 800 applies a clustering algorithm. To illustrate, the parallel model processing system 800 can apply a k-means clustering algorithm. Similarly, the parallel model processing system 800 can apply a BIRCH algorithm, hierarchical clustering algorithm, HCS (highly connected subgraphs) clustering algorithm, or an OPTICS clustering algorithm.

In addition to clustering algorithms, the parallel model processing system 800 can also identify clusters utilizing one or more graph partitioning algorithms. Graph partitioning algorithms partition points in a graph into at least two subsets. For example, a graph partitioning algorithm can determine edge cut costs between points in a graph (e.g., based on distance or some other factor) and then partitions points in the graph based on the determined edge cut costs (e.g., by minimizing the total edge cut cost). The parallel model processing system 800 can apply graph partitioning algorithms to divide digital aerial images based on position into two or more clusters.

The parallel model processing system 800 can apply a clustering algorithm and/or a graph partitioning algorithm utilizing a measure of similarity between digital aerial images. To illustrate, the parallel model processing system 800 can generate a measure of similarity and cluster the digital aerial images based on the measure of similarity. Similarly, the parallel model processing system 800 can identify edges (e.g., localized areas of reduced similarity) and produce graph cuts between digital aerial images by analyzing a measure of similarity.

The parallel model processing system 100 can generate a measure of similarity based on a variety of factors. For instance, the parallel model processing system 800 can generate a measure of similarity based on capture position (e.g., a measure of distance or location relative to other digital aerial images). Similarly, the parallel model processing system 800 can generate a measure of similarity based on capture time (e.g., a measure of time between digital aerial images). Moreover, the parallel model processing system 800 can generate a measure of similarity based on visual characteristics (e.g., generate a measure of similarity from histograms of visual words generated utilizing a bag of visual words algorithm or from a histogram of pixels corresponding to each digital aerial image). Additional detail regarding generating a measure of similarity and utilizing the measure of similarity to generate clusters is discussed below (e.g., in relation to FIGS. 4A-7C).

In one or more embodiments, the parallel model processing system 800 controls the size of clusters. For example, the parallel model processing system 800 can apply a graph partitioning algorithm that controls the number or size of partitions generated by the graph partitioning algorithm. In this manner, the parallel model processing system 800 can generate clusters and control the number of digital aerial images or the amount of data (e.g., number of bits or bytes) in a particular cluster. In particular, the parallel model processing system 800 can apply a cluster threshold that controls the size of clusters. To illustrate, in applying a graph partitioning algorithm, the parallel model processing system 800 can impose constraints that require resulting clusters to satisfy the cluster threshold.

As just mentioned, a cluster threshold can comprise a number of digital aerial images or an amount of data. Moreover, the cluster threshold can comprise a number or percentage relative to other clusters. For example, the cluster threshold can require that clusters have an equal number or percentage of digital aerial images (i.e., equal or within a particular range). For example, in applying a graph partitioning algorithm, the parallel model processing system 800 can partition digital aerial images based on position to generate clusters of equal (or near equal) size.

As mentioned above, in one or more embodiments, the parallel model processing system 800 generates clusters by determining common digital aerial images. For example, the parallel model processing system 800 can utilize a clustering algorithm to identify initial groups, and then expand the initial groups by adding common digital aerial images. Expanding initial groups to add common digital aerial images can increase the efficiency and accuracy of merging clusters.

The parallel model processing system 800 can determine common digital aerial images based on a variety of factors, including a measure of similarity, capture position, capture time, and/or or digital aerial image visual contents. For instance, the parallel model processing system 800 can determine an initial group by applying a clustering algorithm based on capture position. The parallel model processing system 800 can then expand the initial group to include common digital aerial images based on capture time. For example, the parallel model processing system 800 can identify common digital aerial images captured before or after other digital aerial images in the initial group and add the common digital aerial images to generate a cluster.

In one or more embodiments, the parallel model processing system 800 expands an initial group of digital aerial images until satisfying an overlap threshold. For example, the parallel model processing system 800 can have an overlap threshold that comprises a number (or range) of common digital aerial images. The parallel model processing system 800 can add digital aerial images until the number of common digital aerial images satisfies the overlap threshold.

In one or more embodiments, the parallel model processing system 800 utilizes an overlap threshold comprising a distance or a time period. For example, the parallel model processing system 800 can add digital aerial images within a particular distance or time period of an initial group of digital aerial images. Additional detail regarding generating clusters (including common digital aerial images) will be provided below (e.g., in relation to FIG. 4).

As shown in FIG. 2A, upon identifying clusters (at the act 212a), the client device 202 performs the act 212b of sending the clusters to the plurality of computing devices 204. Because the client device 202 had already performed the act 110 of feature detection, the act 212b comprises sending clusters of features corresponding to the digital aerial images 206a-206n. In particular, the parallel model processing system 800 can cluster features detected at the act 110 and send the clustered features (i.e., descriptors) to the plurality of computing devices 204 together with the clustered plurality of digital aerial images. Thus, the act 212b can comprise sending clusters of digital aerial images and/or clusters of features detected at the act 110.

Moreover, as illustrated in FIG. 2A, upon receiving the clusters (i.e., clusters of digital aerial images and corresponding features), the plurality of computing devices 204 perform the act 212c of cluster feature matching. In particular, the plurality of computing devices 204 can analyze each cluster independently (i.e., in parallel) to identify matching features within each cluster. Indeed, as described above in relation to FIG. 1, the parallel model processing system 800 can compare features of a first digital aerial image in a cluster with features of a second digital aerial image in the cluster and identify matching features (i.e., keypoints) based on the comparison.

By analyzing the clusters independently (and controlling the size of each cluster), the parallel model processing system 800 can control the amount of time required to perform the act 212c. Indeed, the parallel model processing system 800 can determine an amount of time required to process a cluster of a first size. The parallel model processing system 800 can control the size of clusters based on the first size (i.e., ensure that the clusters are equal to or within a range of the first size). Because the plurality of computing devices 204 analyze the clusters in parallel, the time to process the clusters as a group is uniform. Thus, the parallel model processing system 800 can control and predict the amount of time required to perform the act 212c (as well as other acts in the model generation pipeline 100).

As shown in FIG. 2A, upon performing the act 212c, the parallel model processing system 800 also utilizes the plurality of computing devices 204 to the perform the act 114 of initial three-dimensional representation generation. In particular, the plurality of computing devices 204 perform the act 214a of initial cluster three-dimensional representation generation. Specifically, the plurality of computing devices 204 analyze each cluster independently to generate an initial three-dimensional representation for each cluster. More specifically, as described in relation to FIG. 1, the plurality of computing devices analyze the matching features for each cluster (from the act 212c) and utilize the matching features for each cluster to generate an initial three-dimensional representation for each cluster (e.g., a sparse cluster point cloud). Again, because the plurality of computing devices perform the act 214a independently for each cluster, the parallel model processing system 800 can control and predict the amount of time required to generate the initial cluster three-dimensional representations.

As shown in FIG. 2A, upon generating the initial cluster three-dimensional representations, the parallel model processing system 800 performs the act 214b of sending the initial cluster three-dimensional representations (i.e., the plurality of cluster three-dimensional representations generated at the act 214a) to the client device 202. Moreover, the client device 202 performs the act 214c of merging the initial cluster three-dimensional representations. In particular, the act 214c includes merging the initial cluster three-dimensional representations to generate an initial three-dimensional representation (e.g., a model merged to reflect the entire site rather than individual clusters).

The parallel model processing system 800 can perform the act 214c based on three-dimensional points in the initial cluster three-dimensional representations (i.e., a plurality of initial three-dimensional representations in a plurality of individual clusters analyzed by a plurality of computing devices). Specifically, the parallel model processing system 800 can determine common data points between different clusters and then combine the clusters based on the common data points. To illustrate, the parallel model processing system 800 can identify common data points in different initial cluster three-dimensional representations. Based on the common data points, the parallel model processing system 800 can calculate one or more transformations between the different initial cluster three-dimensional representations. For example, in one or more embodiments, the parallel model processing system 800 utilizes algorithms such as RANSAC in computing transformations between the cluster three-dimensional representations to prevent outliers to affect. Moreover, the parallel model processing system 800 can apply the one or more transformations to rotate, align, and scale the clusters to match (i.e., within the same coordinate system). In this manner, the parallel model processing system 800 can merge the initial cluster three-dimensional representations.

In performing the act 214c, the parallel model processing system 800 can also apply a bundle adjustment algorithm. For example, upon identifying common points the parallel model processing system 800 applies a bundle adjustment algorithm. In this manner, the parallel model processing system 800 can ensure that the points of the three-dimensional representation (and the determine camera parameters) are constrained and the overall geometry is consistent.

As shown in FIG. 2A, upon merging the initial cluster three-dimensional representations, the client device 202 can perform the act 116 of georeferencing the merged three-dimensional representation. Moreover, the parallel model processing system 800 can perform the act 118 of three-dimensional representation refinement. Furthermore, the parallel model processing system 800 can utilize the client device 202 and the plurality of computing devices 204 to perform the act 120 of densification.

As shown in the embodiment of FIG. 2A, the client device 202 performs the act 220a of cluster identification. It will be appreciated that the parallel model processing system 800 need not, in all circumstances, repeatedly cluster and merge data. For instance, in one or more embodiments, the parallel model processing system 800 will only perform the act 220a (i.e., identifying additional clusters) if previous clusters had not already been identified (i.e., if the act 212a had not been performed and no previous clusters had been generated or analyzed). Similarly, in one or more embodiments, the parallel model processing system 800 will only perform the act 220a (i.e., identifying additional clusters) if the size of clusters identified in step 212a is too large. For example, if the number of points in each cluster is too large for a desired time of processing, the parallel model processing system 800 can perform the act 214a to identify modified or different clusters. It follows, that the acts illustrated in FIGS. 2A-2B are exemplary, and not limiting, and the parallel model processing system 800 can operate by performing some or all of the acts, or by performing the acts in a different order.

In one or more embodiments, the parallel model processing system 800 performs the act 220a by dividing the digital aerial images 206a-206n into clusters. Specifically, the parallel model processing system 800 can generate clusters of digital aerial images and identify corresponding points from the three-dimensional representation (generated at the act 118) corresponding to each of the digital aerial images. In this manner, the parallel model processing system 800 can generate clusters of digital aerial images and/or three-dimensional points from the refined three-dimensional representation.

Because the parallel model processing system 800 has already generated a refined three-dimensional representation (at the act 118), the parallel model processing system 800 can also perform the act 220a of cluster identification by dividing the three-dimensional representation into clusters (in addition to, or in the alternative to, dividing digital aerial images into clusters).

In one or more embodiments, the parallel model processing system 800 identifies clusters from a three-dimensional representation utilizing a clustering algorithm (as described above in relation to the act 212a). For example, in one or more embodiments, the parallel model processing system 800 analyzes a three-dimensional representation with a plurality of three-dimensional points (i.e., points in a point cloud). The parallel model processing system 800 can apply a clustering algorithm to the plurality of three-dimensional points to generate clusters.

Similarly, the parallel model processing system 800 can also generate clusters from a three-dimensional model by applying a graph partitioning algorithm. In particular, the parallel model processing system 800 can identify three-dimensional points of a three-dimensional representation. The parallel model processing system 800 can apply a graph partitioning algorithm to the three-dimensional points to generate two or more clusters.

Moreover, as discussed above, the parallel model processing system 800 can also generate clusters from a three-dimensional representation by utilizing an initial group of three-dimensional points and expanding the initial group with common three-dimensional points. For example, the parallel model processing system 800 can expand an initial group of three-dimensional points by extending the initial group by a particular distance in one or more directions (e.g., from a cluster center or other seed point or utilizing a camera as center).

Indeed, as described previously (e.g., in relation to the act 212a) the parallel model processing system 800 can expand an initial group of three-dimensional points based on an overlap threshold. For instance, the overlap threshold can comprise a number of common three-dimensional points or a distance. To illustrate, the parallel model processing system 800 can apply an overlap threshold that requires a minimum number of common three-dimensional points. The parallel model processing system 800 can add common three-dimensional points until the minimum number of common three-dimensional points for each cluster has been satisfied. As discussed above, the parallel model processing system 800 can perform more accurately with at least a threshold number of common three-dimensional points. To illustrate, the parallel model processing system 800 can perform a more stable and accurate bundle adjustment when the number of common three-dimensional points is greater than a threshold number of points.

Furthermore, as described above, the parallel model processing system 800 can also control the size of each cluster (e.g., by utilizing a cluster threshold in applying a graph partitioning algorithm). In particular, the parallel model processing system 800 can apply constraints with regard to the number of three-dimensional points, the number of digital aerial images, or the data size corresponding to each cluster. By controlling the size of each cluster, the parallel model processing system 800 can control the amount of time required to analyze the clusters. Thus, the parallel model processing system 800 can reduce the amount and variability of processing time.

Indeed, as shown in FIG. 2B, the parallel model processing system 800 also performs the act 220b of sending the clusters to the plurality of computing devices 204. In particular, the act 220b can include sending clusters of three-dimensional points from a three-dimensional representation (i.e., the refined three-dimensional representation of the act 118) to the plurality of computing devices 204. The act 220b can also comprise sending clusters of digital aerial images corresponding to the clusters of three-dimensional points to the plurality of computing devices 204.

As illustrated in FIG. 2B, the parallel model processing system 800 also utilizes the plurality of computing devices 204 to perform the act 220c of cluster densification. In particular, the plurality of computing devices 204 can individually analyze the clusters of three-dimensional points and clusters of digital aerial images (received at the act 220b) and generate additional three-dimensional points for each cluster. Accordingly, the parallel model processing system 800 can generate additional detail for each cluster three-dimensional representation by analyzing each cluster individually (in parallel). Moreover, the parallel model processing system 800 can do so in a predictable amount of time (i.e., based on the size of each cluster).

Moreover, as illustrated in FIG. 2B, the parallel model processing system 800 also utilizes the plurality of computing devices 204 to perform the act 222a of full cluster three-dimensional representation reconstruction. In particular, the parallel model processing system 800 analyzes each densified cluster three-dimensional representation (from the act 220c) to generate corresponding full cluster three-dimensional representations. For example, the parallel model processing system 800 can utilize the plurality of computing devices 204 to generate a three-dimensional mesh for each cluster.

In addition, as shown in FIG. 2B, the parallel model processing system 800 can perform the act 222b of sending the full cluster three-dimensional representations to the client device 202. Moreover, the client device 202 can perform the act 222c of merging the full cluster three-dimensional representations. As described above, the parallel model processing system 800 can perform the act 222c by aligning the full cluster three-dimensional representations. In particular, the parallel model processing system 800 can identify common three-dimensional points from the full cluster three-dimensional representations. The parallel model processing system 800 can calculate one or more transformations based on the common three-dimensional points. Moreover, the parallel model processing system 800 can apply the one or more transformations to merge the full cluster three-dimensional representations into a single full three-dimensional representation. In addition, as mentioned above, the parallel model processing system 800 can also perform an additional bundle adjustment.

Upon generating a merged, full three-dimensional representation, as shown in FIG. 2B, the parallel model processing system 800 utilizes the client device 202 to perform the act 124 of rendering. In particular, the parallel model processing system 800 can generate an orthophoto utilizing the full three-dimensional representation and provide the orthophoto for display via a display of the client device 202. Similarly, the parallel model processing system 800 can generate a rendering of the full three-dimensional representation via a display screen of the client device 202.

As described in relation to FIG. 2A-2B, the parallel model processing system 800 can control the amount of time required to perform the model generation pipeline 100 by identifying clusters, analyzing the clusters via a plurality of computing devices, and then merging the analyzed clusters. Although FIGS. 2A-2B illustrate particular acts being performed by the client device 202 and/or the plurality of computing devices 204, in alternative embodiments, the parallel model processing system 800 can perform the acts utilizing alternate devices.

For example, although FIGS. 2A-2B illustrate the client device 202 performing the acts 212a and 220a of cluster identification and the acts 214c and 222c of merging, the parallel model processing system 800 can also perform the acts 212a and 220a of cluster identification and the acts 214c and 222c at the plurality of computing devices 204. Indeed, the client device 202 can send digital aerial images, features, and/or or three-dimensional representations to the plurality of computing devices 204 and the plurality of computing devices 204 can identify clusters, analyze the clusters, and merge the analyzed clusters before returning the merged clusters to the client device 202. Accordingly, generating clusters and merging data can be performed at either (or both) of the client device 202 and the plurality of computing devices 204. In one or more embodiments, the parallel model processing system 800 utilizes a single device (e.g., the computing device 202) to merge clusters to increase accuracy (e.g., by doing a global optimization process at a single computing device, rather than separate computing devices, the parallel model processing system 800 can avoid misalignment).

Furthermore, although FIGS. 2A-2B illustrate identifying clusters and merging clusters in relation to particular acts of the model generation pipeline 100, the parallel model processing system 800 can identify clusters, analyze clusters, and merge clusters in relation to a variety of different acts of the model generation pipeline 100. Indeed, the parallel model processing system 800 can utilize a variety of transition points within the model generation pipeline 100 to transition from analysis on a client device to analysis on a plurality of computing devices. Accordingly, the parallel model processing system 800 can utilize a variety of paths to generate a site model from a plurality of digital images.

Figure 3A:
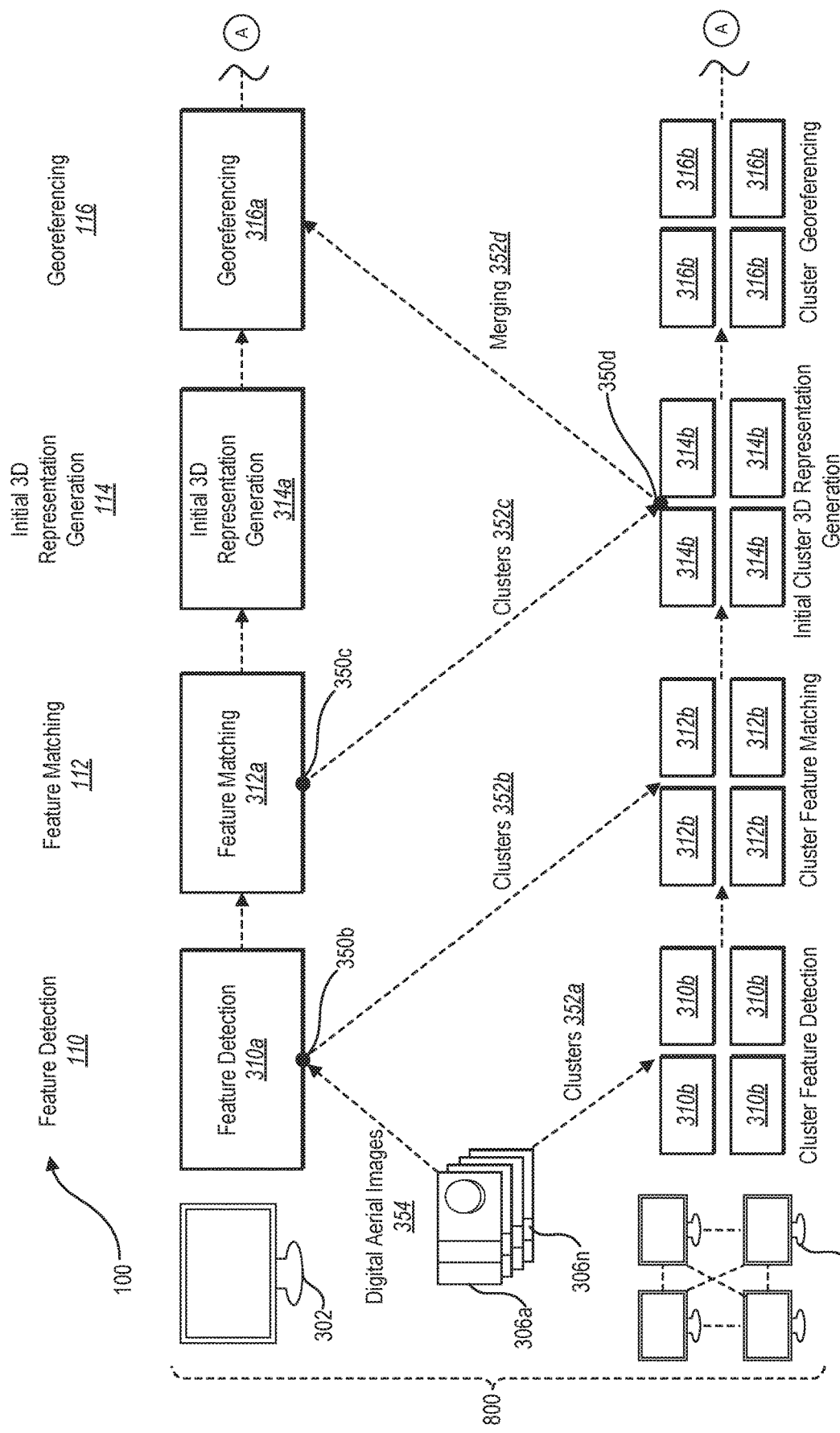
FIGS. 3A-3B illustrate another flowchart of acts in generating a site model in accordance with one or more embodiments.
Figure 3B:
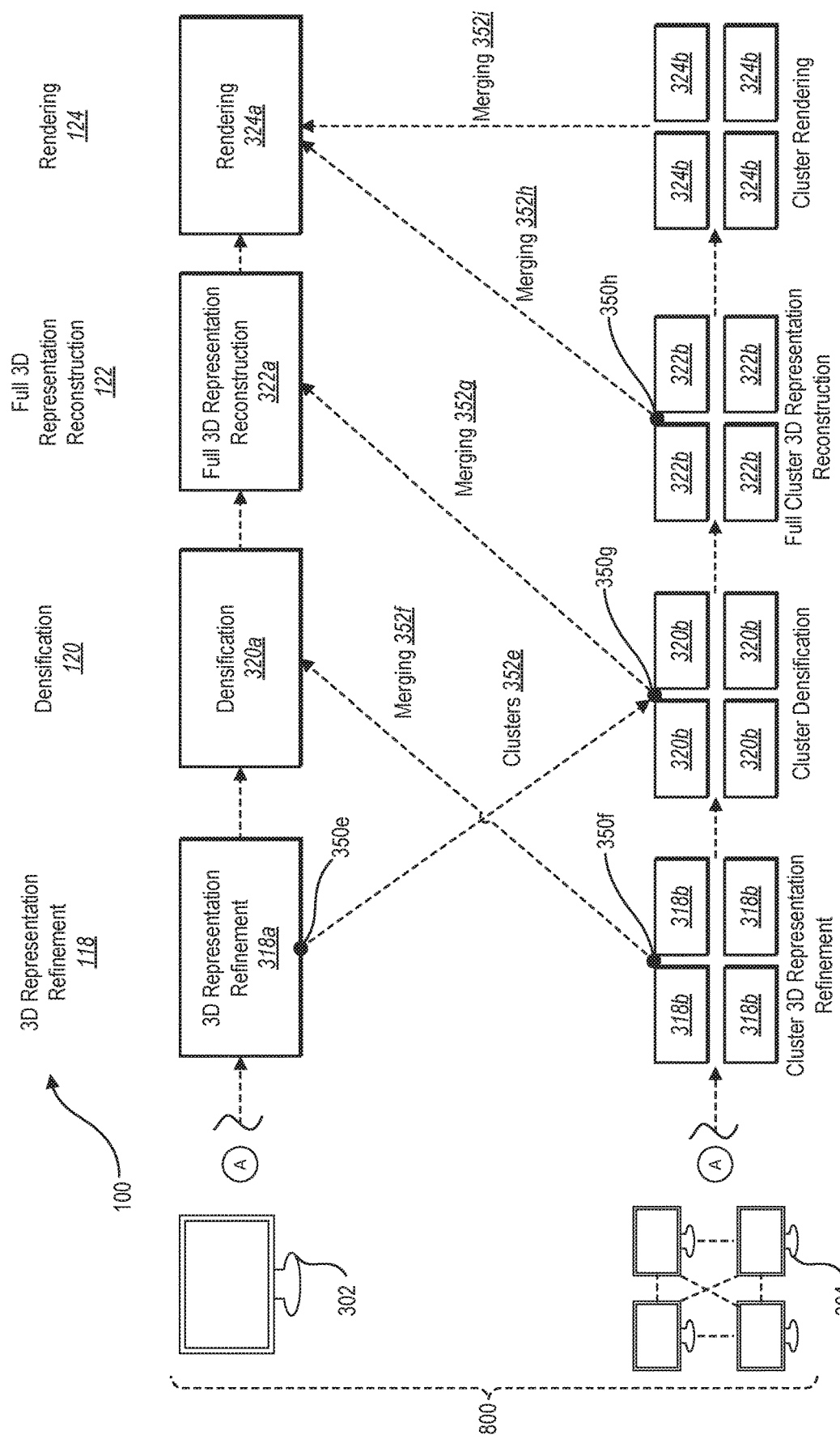

For example, FIGS. 3A-3B illustrate various paths (and transition points) for generating a site model utilizing a client device and a plurality of computing devices. In particular, FIGS. 3A-3B illustrate a client device 302 (e.g., the client device 202) and a plurality of computing devices 304 (e.g., the plurality of computing devices 204). The parallel model processing system 800 receives a plurality of digital aerial images 306a-306n of a site captured by a UAV. The parallel model processing system 800 then performs the model generation pipeline 100 utilizing the client device 302 and the plurality of computing devices 304.

In particular, FIGS. 3A-3B illustrate various paths for performing the model generation pipeline 100 utilizing the client device 302 and the plurality of computing devices 304. Specifically, the parallel model processing system 800 can transition between the client device 302 and the plurality of computing devices 304 at transition points 350a-350h, thus utilizing the client device 302 and the plurality of computing devices 304 to generate a site model from the plurality of digital aerial images 306a-306n. Indeed, as shown, at each of the transition points 350a-350h, the parallel model processing system 800 can generate a cluster and/or merge data utilizing either the client device 302 or the plurality of computing devices 304. Moreover, at each of the transition points 350a-350h, the parallel model processing system 800 can send data (e.g., a cluster or analyzed data) between the client device 302 and the plurality of computing devices 304. Accordingly, as illustrated in FIGS. 3A-3B the parallel model processing system 800 can utilize a variety of paths to generate a site model from the plurality of digital aerial images.

For example, similar to the route described in FIGS. 2A-2B, the parallel model processing system 800 can perform an act 354 of providing the digital aerial images 306a-306n to the client device 302 and perform the act 310a of feature detection (corresponding to the act 110) at the client device 302. Moreover, at the transition point 350b the parallel model processing system 800 can perform the act 352b of generating and providing the clusters to the plurality of computing devices 304. As mentioned above, the parallel model processing system 800 can identify clusters at the client device 302 and/or the plurality of computing devices 304. In addition, the plurality of computing devices 304 can perform the act 314b of initial cluster three-dimensional representation generation.

Further, the parallel model processing system 800 can then perform the act 352d of merging the initial cluster three-dimensional representations. The client device 302 can then perform the act 316a of georeferencing and the act 318a of three-dimensional representation refinement. The parallel model processing system 800 can also perform the act 352e of generating clusters and providing the clusters to the plurality of computing devices 304. Further, the plurality of computing devices 304 can perform the acts 320b of cluster densification and 322b of full cluster three-dimensional representation reconstruction. The parallel model processing system 800 can perform the act 352h of merging the full cluster three-dimensional representations. The client device 302 can then perform the act 324a of rendering.

In short, similar to FIGS. 2A-2B, the parallel model processing system 800 can follow a path comprising the acts 354, 310a, 352b, 312b, 314b, 352d, 316a, 318a, 352e, 320b, 322b, 352h, 324a.

Although the foregoing example illustrates a particular path, the parallel model processing system 800 can generate a site model utilizing a variety of different paths through the model generation pipeline 100. For example, the parallel model processing system 800 can perform the act 352a of generating and providing clusters of the plurality of digital aerial images to the plurality of computing devices 304. The plurality of computing devices 304 can perform the act 310b of cluster feature detection, the act 312b of cluster feature matching, and the act 314b of initial cluster three-dimensional representation generation. At the transition point 350d, the parallel model processing system 800 can perform the act 352d of merging the initial three-dimensional representation generations. Moreover, the client device 302 can perform the act 316a of georeferencing, the act 320a of densification, the act 322a of full three-dimensional representation reconstruction, and the act 324a of rendering. In other words, the parallel model processing system 800 can follow a path comprising the acts 354, 352a, 310b, 312b, 314b, 352d, 316a, 318a, 320a, 322a, 324a.

In addition to the foregoing example, the parallel model processing system 800 can generate a site model utilizing a variety of additional paths. To illustrate, in one or more embodiments, the parallel model processing system 800 follows a path comprising acts 354, 352a, 310b, 312b, 314b, 352d, 316a, 318a, 352e, 320b, 322b, 324b, 352i. In another embodiment, the parallel model processing system 800 follows a path comprising acts 354, 310a, 312a, 352c, 314b, 316b, 318b, 320b, 322b, 352h, 324a.

As the foregoing demonstrates, the parallel model processing system 800 can utilize a variety of routes and perform a variety of acts utilizing a different computing devices to generate a digital model. In one or more embodiments, the parallel model processing system 800 selects a route (e.g., selects which acts to perform at what computing devices). The parallel model processing system 800 can select a route based on a variety of different factors. For example, the parallel model processing system 800 can select a route based on size of a data set (e.g., a number or size of a plurality of digital aerial images of a site), a type of position data corresponding to a plurality of digital aerial images (e.g., GPS, ground control points, or RTK data), desired (or required) accuracy, desired (or required) processing time, cost of utilizing a plurality of computing devices, the available system resources of computing devices, estimated processing time, or amount of overlap between digital aerial images.

As just mentioned, the parallel model processing system 800 can select a route based on size of a data set. To illustrate, for small data sets, the parallel model processing system 800 can perform additional acts on the client device 302 rather than the plurality of computing devices 304. Indeed, identifying clusters and merging data can impose some additional processing requirements in identifying site models or could decrease accuracy of the reconstruction. Accordingly, for small data sets (i.e., data sets below a size threshold), the parallel model processing system 800 can select a route that performs additional acts at the client device 302. For large data sets (i.e., data sets above a size threshold), the parallel modeling system can select a route that performs additional acts at the plurality of computing devices 304 (e.g., where the time gain of analyzing data in parallel exceeds the processing time of clustering and/or merging data).

The parallel model processing system 800 can also select a route based on a type of position data corresponding to a plurality of digital aerial images. For example, some types of position data tend to be more accurate than other types of position data. Less accurate position data can result in less accurate clusters or merging. Accordingly, the parallel model processing system 800 can perform additional clustering and/or merging steps (e.g., perform additional steps at the plurality of computing devices) where the type of position data tends to be more accurate. To illustrate, RTK position data (i.e., data reflecting GPS data corrected by information from an RTK network) tends to be more accurate than GPS data alone. Accordingly, where RTK data is available, the parallel model processing system 800 can perform additional acts at the plurality of computing devices 304.

The parallel model processing system 800 can also select a route based on desired (or required) accuracy. For example, to increase accuracy, the parallel model processing system 800 can reduce clustering and merging steps. The parallel model processing system 800 can determine a desired accuracy level (e.g., based on user input) and then select route that will satisfy the desired accuracy level. As mentioned above, to increase accuracy, the parallel model processing system 800 can also increase an overlap threshold.

Furthermore, the parallel model processing system 800 can also select a route based on desired (or required) processing time. In particular, to decrease the amount of time, the parallel model processing system 800 can select a route that increases the number of steps performed by the plurality of computing devices 304. The parallel model processing system 800 can determine a desired amount of time (e.g., based on user input) and then select a route that will satisfy the desired amount of time. As mentioned above, the parallel model processing system 800 can also modify an overlap threshold to change the amount of time to generate a model via a model generation pipeline.

The parallel model processing system 800 can also select a route based on a cost of utilizing a plurality of computing devices. Indeed, as discussed above, in one or more embodiments, the parallel model processing system 800 the plurality of computing devices 304 can comprise a third-party cloud computing network that provides virtual computing services. The parallel model processing system 800 can thus select a route based on the cost of utilizing such a third-party service. Indeed, the higher the cost, the parallel model processing system 800 can increasingly utilize the client device to perform steps of the model generation pipeline 100.

In addition, the parallel model processing system 800 can also select a route based on an estimated processing time. To illustrate, the parallel model processing system 800 can estimate a first amount of time to perform one or more acts utilizing the client device 302 and a second amount of time to perform the one or more acts utilizing the plurality of computing devices 304. The parallel model processing system 800 can select a route by comparing the first amount of time and the second amount of time.

For instance, in one or more embodiments, the parallel model processing system 800 selects a route based on multiple factors described above. For example, the parallel model processing system 800 processing times and cost. For instance, the parallel model processing system 800 can compare a first amount of time to perform one or more acts utilizing the client device 302, a second amount of time to perform the one or more acts utilizing the plurality of computing devices 304, and the cost of utilizing the plurality of computing devices.

To illustrate, the parallel model processing system 800 can determine a cost threshold for each additional unit of time imposed by utilizing the client device 302. For example, the parallel model processing system 800 can determine a cost threshold of ten dollars per minute of extra time imposed. If the parallel model processing system 800 determines that the client device 302 will take an additional two hours to perform one or more acts, so long as the cost of utilizing the plurality of computing devices does not exceed $1,200, the parallel model processing system 800 will select a route that performs the one or more acts utilizing the plurality of computing devices 304.

The parallel model processing system 800 can select a route at a variety of different times. For example, in one or more embodiments, the parallel model processing system 800 selects a route prior to performing acts of the model generation pipeline 100. For example, the parallel model processing system 800 can determine that digital aerial images captured by a UAV have corresponding RTK data (rather than GPS data alone). In response, the parallel model processing system 800 can select a route that performs additional acts utilizing the plurality of computing devices 304. For example, the parallel model processing system 800 can select a route comprising the acts of 354, 352a, 310b, 312b, 314b, 352d, 316a, 318a, 352e, 320b, 322b, 352h, and 324a.

In other embodiments, the parallel model processing system 800 selects a route while performing acts of the model generation pipeline 100. For example, the parallel model processing system 800 can select and/or modify a route at one or more of the transition points 350a-350h. To illustrate, the parallel model processing system 800 can perform the act 354 and the act 310a. Then, at the transition point 350b, the parallel model processing system 800 can select whether to perform the acts 352b and 312b or perform the act 312a.

For instance, at the transition point 350b the parallel model processing system 800 can detect an amount of time required to perform the act 310a at the client device 302. Based on the amount of time required to perform the act 310a, the parallel model processing system 800 can select whether to perform the act 312a or perform the acts 352b and 312b. For example, if the time required to perform the act 310a of feature detection exceeds an estimated or threshold time, the parallel model processing system 800 can select acts 352b and 312b. Similarly, the parallel model processing system 800 can perform the acts 312b and 314b and select or modify a path at the transition point 350d.

In some circumstances, the parallel model processing system 800 can cluster or modify data based on the information generated at previous acts of the model generation pipeline 100. For example, at the act 352g of merging, the parallel model processing system 800 can utilize information generated from previous acts in the model generation pipeline 100. Specifically, at the act 118 of three-dimensional representation refinement, the parallel model processing system 800 can determine camera pose (i.e., orientation) at the time of capture of the digital aerial images. The parallel model processing system 800 can utilize the camera pose to generate clusters at the act 352g. For example, the parallel model processing system 800 can cluster digital aerial images based on where the camera is pointed (rather than based on capture location). Indeed, although two digital aerial images may have similar capture location, they may be directed in two different directions. The parallel model processing system 800 can cluster the digital aerial images based on where a camera is pointed and located utilizing the camera pose for digital aerial images.

Similarly, the parallel model processing system can apply different thresholds or criteria at different acts of the model generation pipeline 100. For example, the parallel model processing system 800 can apply a first overlap threshold at the act 352a and a second overlap threshold at the act 352e (e.g., based on the type of data in different clusters, based on the analysis to be performed on the clusters, based on an amount of time to perform subsequent or previous acts). Moreover, the parallel model processing system 800 can apply a first cluster threshold at the act 352b and a second cluster threshold at the act 352e (e.g., based on the type of data, based on the analysis to be performed on the clusters, or based on an amount of time to perform subsequent or previous acts).

As shown in FIGS. 3A-3B, the parallel model processing system 800 can perform multiple different acts of merging. In particular, FIGS. 3A-3B illustrate at least five potential merging acts, including 352d, 352f, 352g, 352h, and 352i. Because each of these merging acts can be based on different data in different clusters, the merging process can also vary for each merging act. Additional detail will now be provided regarding each of these merging steps.

As shown in FIG. 3A, the act 352d includes merging initial cluster three-dimensional representations generated at the computing devices 304. In one or more embodiments, each cluster three-dimensional representation will have its own local coordinate system. In such circumstances, in order to merge at the act 352d, the parallel model processing system 800 generates multiple transformations (e.g., Helmert transformations) between the cluster three-dimensional representations. For example, in one or more embodiments, the parallel model processing system 800 generates a relative transformation between each of the cluster three-dimensional representations to place the cluster three-dimensional representations on the same coordinate system.

To generate such a transformation, the parallel model processing system 800 can utilize common points (e.g., common three-dimensional points and/or common cameras). Specifically, the parallel model processing system 800 can identify a first set of points in a first cluster three-dimensional representation and a corresponding second set of points (e.g., points that represent the same real-world object) in a second cluster three-dimensional representation. The parallel model processing system 800 can then utilize the first set of points and the second set of points (i.e., common points) to determine and apply a transformation between the first cluster three-dimensional representation and the second cluster three-dimensional representation.

Upon applying a transformation to the cluster three-dimensional representations, alignment of the three-dimensional representations (and/or corresponding camera positions/parameters) may not be perfect (e.g., due to inaccuracy of photogrammetry). For fine alignment of the cluster three-dimensional representations, the parallel model processing system 800 can apply an additional bundle adjustment. Specifically, the parallel model processing system 800 can identify a set of common overlap points (and/or cameras). The parallel model processing system 800 can apply a bundle adjustment algorithm to optimize the set of common overlap points.

Furthermore, the parallel model processing system 800 can perform an extra optimization (e.g., an extra bundle adjustment optimization based on overlap points for each cluster three-dimensional model). In such an extra optimization, the parallel model processing system 800 can fix (or hold) common points (and/or overlapping cameras common across cluster three-dimensional models). For instance, the parallel model processing system can hold common points and common camera poses and perform the extra optimization.

Moreover, the parallel model processing system 800 can transform the cluster three-dimensional representations into a unified three-dimensional representation. In particular, in one or more embodiments, the parallel model processing system 800 transforms each cluster three-dimensional representation into a global coordinate system to generate a merged three-dimensional representation.

As shown in FIG. 3B, in addition to the act 352*d*, the parallel model processing system 800 can also merge clusters at the act 352*f*. In particular, the parallel model processing system 800 can merge cluster three-dimensional representations after the act 318*b* of cluster three-dimensional representation refinement. In one or more embodiments, the merging act 352*f* can mirror the merging act 352*d*. In other embodiments, the merging act 352*f* may differ. For example, because the cluster three-dimensional representations have already been georeferenced (e.g., at the act 316*b*) one or more embodiments, one or more embodiments utilize the georeference information to perform the act 352*f*.

To illustrate, the parallel model processing system 800 can take advantage of georeferenced information (e.g., GPS information for each camera position), to determine relative transforms between cluster three-dimensional models. Specifically, in one or more embodiments, the parallel model processing system 800 transforms each camera geolocation into a local coordinate and computes a transformation (e.g., Helmert transformation) between the cluster three-dimensional representations. In one or more embodiments, the parallel model processing system 800 can utilize this approach (i.e., georeferenced information) to merge cluster three-dimensional representations without a need for common points. Indeed, by determining transformations based on the georeferenced information, in some embodiments, the parallel model processing system 800 can merge the clusters without utilizing common points.

As discussed above in relation to the act 352*d*, the parallel model processing system 800 can then align/optimize the cluster three-dimensional representations. For example, the parallel model processing system 800 can perform a bundle adjustment optimization and/or an extra optimization, as described in relation to the act 352*d*. In these processes, the parallel model processing system 800 can also utilize georeferenced information. For instance, the parallel model processing system 800 can include GPS geolocation to constrain the extra bundle adjustment optimization described in relation to the act 352*d*.

As shown in FIG. 3B, the parallel model processing system 800 can also perform the merging act 352*g*. In particular, the act 352*g* includes merging densified cluster three-dimensional representations. The act 352*g* can include the techniques, processes, and/or steps described above in relation to acts 352*d* and 352*f*. For instance, the act 352*g* can also include merging (e.g., concatenation) of georeference information (e.g., georeferenced point clouds and/or camera poses) and/or common points (i.e., aligned point clouds) to produce a merged three-dimensional representation. However, as just mentioned, at the act 352*g*, the cluster three-dimensional representations have gone through a densification process. If densification produces additional data for the three-dimensional points (such as confidence of the estimation and/or normal vectors) the parallel model processing system 800 can further filter points (e.g., erroneous points) by reducing photogrammetric error (e.g., by projecting points to each view and filtering by points that occlude themselves with respect to related cameras).

As illustrated in FIG. 3B, the parallel model processing system 800 can also perform the merging act 352*h*, which includes merging cluster three-dimensional representations after full cluster three-dimensional reconstruction. The merging act 352*h* can also include the techniques, processes, and/or steps described above (e.g., in relation to the acts 352*d*, 352*f*, and 352*g*). However, in one or more embodiments, because of the additional processing of the cluster three-dimensional models (i.e., the act 322*b*), the merging act 352*h* can include mesh stitching or zippered polygon mesh methods.

For example, in one or more embodiments, the parallel model processing system 800 applies three main stages (or acts) in performing the merging act 352*h*. First, the parallel model processing system 800 can apply an iterative closest point algorithm. An iterative closest point algorithm can minimize the difference between two cluster three-dimensional representations. Second, the parallel model processing system 800 performs an integration stage. In particular, the parallel model processing system 800 can remove overlapping regions by calculating new vertices and integrating them with new polygons (e.g., triangles) along the intersections of mesh boundaries. Third, the parallel model processing system 800 can perform a consensus stage. In particular, the parallel model processing system 800 can recalculate each vertex position using the mesh from the second stage. For example, the parallel model processing system 800 can calculate each vertex position as the average position of the vertices that contribute to it (i.e., using the trimmed mesh from the second stage) to improve the quality of the resulting surface.

In addition, in one or more embodiments, the parallel model processing system 800 performs the act 352*h* by repairing possible mesh problems. The parallel model processing system 800 can utilize a variety of different approaches to repair mesh problems. For example, the parallel model processing system 800 can apply hole filling techniques, mesh smoothing techniques, mesh sharpening techniques, and/or topology correction techniques.

As shown in FIG. 3B, the parallel model processing system 800 can also perform the merging act 352*i*, which includes merging clusters that include rendered models (e.g., an orthophoto). In one or more embodiments, the parallel model processing system 800 performs the act 352*i* (e.g., merges orthophotos) via image stitching. For example, the parallel model processing system 800 can detect keypoints and extract local invariant descriptors from the rendered cluster models. The parallel model processing system 800 can match the descriptors between images to estimate a homography matrix using a RANSAC algorithm. Moreover, the parallel model processing system 800 can apply a warping transformation using the estimated homography matrix. In one or more embodiments, the parallel model processing system 800 further increases the quality of the final merged model by applying an average intensity algorithm or a gain compensation algorithm.

Turning now to FIGS. 4A-7C, additional detail will be provided regarding identifying clusters in accordance with one or more embodiments of the parallel model processing system 800. In particular, FIGS. 4A-4D illustrate identifying clusters utilizing a measure of similarity based on capture position, FIGS. 5A-5D illustrate identifying clusters utilizing a measure of similarity based on capture time, and FIGS. 6A-6D illustrate utilizing a measure of similarity based on visual content of digital aerial images. Moreover, FIGS. 7A-7C illustrate utilizing a measure of similarity based on multiple different factors (e.g., capture position, capture time, and visual content) to determine clusters.

For example, FIGS. 4A-4D illustrate a site 400 and a plurality of capture positions 402a-402n. Each of the capture positions 402a-402n reflect a location where a camera captured a digital aerial image of the site 400. In relation to the embodiment of FIG. 4A, a UAV affixed to a camera traverses a site in a series of parallel paths while capturing digital aerial images at the capture positions 402a-402n.

As discussed above, capture position can include a location of a camera and/or an orientation of a camera. For illustration purposes, the capture positions 402a-402n illustrate a location of a camera. In some embodiments, the parallel model processing system 800 can determine the capture positions 402a-402n based on both capture location and orientation (e.g., where a camera is pointing to at the time of capture).

In addition, as mentioned above, the parallel model processing system 800 can generate clusters based on capture position of a plurality of digital aerial images. In particular, the parallel model processing system 800 can identify an initial group of digital aerial images (e.g., by applying a clustering algorithm and/or graph partitioning algorithm) and expand the digital aerial images to include common images based on capture position of the digital aerial images.

For instance, FIG. 4B illustrates a plurality of initial groups 404a-404d of digital aerial images. In particular, the parallel model processing system 800 generates the plurality of initial groups 404a-404d by comparing the capture positions 402a-402n. More specifically, the parallel model processing system 800 applies a graph partitioning algorithm to the capture positions 402a-402n (i.e., the measure of similarity between the digital aerial images). As shown in FIG. 4B, the parallel model processing system 800 divides the capture positions 402a-402n into four approximately equal groups. Specifically, the parallel model processing system 800 applies a cluster threshold that imposes a condition requiring that the initial groups 404a-404d contain equal (or approximately equal) capture positions.

As mentioned above, the parallel model processing system 800 generates the plurality of initial groups 404a-404d by analyzing (e.g., comparing) a measure of similarity. In relation to the embodiment of FIG. 4A the measure of similarity is based on capture position. The measure of similarity can comprise any variety of values or measures. For example, the parallel model processing system 800 can utilize the capture positions (e.g., coordinates in space) as the measure of similarity. Similarly, the parallel model processing system 800 can utilize distance (e.g., distance between the digital aerial images) as the measure of similarity. As discussed in subsequent figures, the measure of similarity can also be based on other factors, such as capture time and/or visual content.

Although FIG. 4B illustrates applying a cluster threshold that requires an equal (or approximately equal) number of capture positions, as mentioned earlier, the parallel model processing system 800 can apply a variety of cluster thresholds. For example, in one or more embodiments the parallel model processing system 800 can apply a cluster threshold that comprises a maximum (and/or minimum) cluster size. For instance, the parallel model processing system 800 can require that each cluster (and/or each of the initial groups 404a-404d) contain a minimum and/or maximum number of digital aerial images (or capture positions). Moreover, the parallel model processing system 800 can require a minimum and/or maximum data size in each cluster (e.g., a maximum number of bytes for digital aerial images corresponding to capture positions in each initial group).

Furthermore, as mentioned previously, the parallel model processing system 800 can also expand initial groups to generate clusters with common digital aerial images. As used herein, the term "common digital aerial images" refers to digital aerial images belonging to two or more clusters. Similarly, the term "common data points" refers to data points belonging to two or more clusters.

In one or more embodiments, parallel model processing system 800 expands initial groups based on an overlap threshold to generate clusters with common digital aerial images. For instance, the parallel model processing system 800 can expand initial groups based on an overlap threshold comprising a distance. In this manner, the parallel model processing system 800 can increase the amount of overlap and shared points between clusters.

In one or more embodiments, the parallel model processing system 800 can expand initial groups based on a measure of similarity until satisfying the overlap threshold. Indeed, as discussed in greater detail below (e.g., FIG. 5D, FIG. 6C, and FIG. 7C), the parallel model processing system 800 can expand initial groups based on any measure of similarity. For instance, the parallel model processing system 800 can expand initial groups based on capture position, capture time, and/or visual content to satisfy an overlap threshold.

To illustrate, FIG. 4C illustrates expanding the initial group 404b based on capture position to satisfy a distance overlap threshold and generate the cluster 406b. In particular, the parallel model processing system 800 applies an overlap threshold 408 that comprises a distance from capture positions already included in the initial group 404b. The parallel model processing system 800 applies the overlap threshold 408 by identifying capture positions within the overlap threshold 408 from capture positions already included in the initial group 404b. All capture positions falling within the overlap threshold 408 are added to the cluster 406b as common digital aerial images.

As mentioned above, in one or more embodiments, the overlap threshold also includes a maximum and/or minimum number of common digital aerial images. For example, the parallel model processing system 800 can require a minimum and/or maximum number of common digital aerial images between two or more clusters. For example, the overlap threshold 408 can include a distance and a minimum and/or maximum number of common digital aerial images between two clusters. The parallel model processing system 800 can adjust the distance such that the number of common digital aerial images satisfies the minimum and/or maximum number of common digital aerial images. Accordingly, the overlap threshold 408 can comprise both a distance and a number of digital aerial images.

In addition to expanding the initial group 404b to generate the cluster 406b, the parallel model processing system 800 can also expand the initial groups 404a, 404c, and 404d. In particular, the parallel model processing system 800 can expand the initial groups 404a, 404c, and 404d based on the overlap threshold 408 to add common digital aerial images. For example, FIG. 4D illustrates expanding the initial groups 404a-404d to generate the clusters 406a-406d. As shown, the clusters 406a-406d comprise common digital aerial images that are common to other clusters. For example, as shown in FIG. 4D, the cluster 406a includes common digital aerial images that are common to the clusters 406b, 406c, and 406d.

As mentioned above, the parallel model processing system 800 can also generate clusters utilizing a measure of similarity based on capture time. For example, FIGS. 5A-5D illustrate generating clusters utilizing a measure of similarity based on capture time. In particular, FIG. 5A illustrate a timeline 500 showing capture times 502a-502n of digital aerial images of a site captured by a camera affixed to a UAV. The parallel model processing system 800 can analyze the capture times 502a-502n and generate a plurality of initial groups. Moreover, the parallel model processing system 800 can add common digital aerial images to the initial groups.

For example, as shown in FIG. 5B, the parallel model processing system 800 applies a clustering algorithm to the plurality of capture times 502a-502n to generate initial groups 504a-504d. Moreover, the parallel model processing system 800 expands the initial groups 504a-504d to generate clusters. For example, as shown in FIG. 5C the parallel model processing system 800 expands the initial group 504a to generate the cluster 506a. Specifically, the parallel model processing system 800 expands the initial group 504a based on an overlap threshold comprising a period of time. Specifically, the parallel model processing system 800 identifies an overlap threshold of a period of time (e.g., thirty seconds from any capture time in the initial group 504a) and expands the initial group 504a to include digital aerial images with a capture time that satisfies the overlap threshold (i.e., adds digital aerial images with capture times within thirty seconds of the initial group 504a). In this manner, the parallel model processing system 800 generates the cluster 506a.

As mentioned above, the overlap threshold can comprise a number of common digital aerial images in addition to a time period. Thus, for example, the parallel model processing system 800 can determine the time period of the overlap threshold so that the number of common digital aerial images is above a minimum or below a maximum number of digital aerial images.

Furthermore, as discussed above, the measure of similarity can comprise a variety of different values or measures. For example, the measure of similarity in relation to FIGS. 5A-5D is capture time (e.g. the parallel model processing system 800 utilizes capture time to generate the initial groups 504a-504d and expand the initial groups to generate the clusters 506a-506d). In other embodiments, the measure of similarity may be more indirectly based on capture time, such as a time difference.

Although FIGS. 5A-5C illustrate identifying initial groups based on capture time and expanding initial groups based on capture time, the parallel model processing system 800 can also identify clusters based on both capture position and capture time. For example, FIG. 5D illustrates identifying clusters based on both capture position and capture time. In particular, FIG. 5D illustrates the site 400 and the capture positions 402a-402n of digital aerial images. Moreover, FIG. 5D illustrates the initial group 404a. As mentioned above, the parallel model processing system 800 identifies the initial group 404a based on the capture positions 402a-402n. In the embodiment, of FIG. 5D, the parallel model processing system 800 expands the initial group 404a to generate the cluster 510 based on the capture time of the digital aerial images.

Specifically, the parallel model processing system 800 determines a capture time corresponding to the digital aerial images of the initial group 404a. The parallel model processing system 800 expands the initial group 404a to the cluster 510 based on an overlap threshold comprising a time period. In particular, the parallel model processing system 800 adds digital aerial images to the cluster 510 with capture times that fall within the overlap threshold. For example, applying an overlap threshold of 30 seconds, the parallel model processing system 800 can add digital aerial images with captured times within 30 seconds of any other digital aerial image in the initial group 404a.

Although FIG. 5D illustrates identifying the initial group 404a utilizing a measure of similarity based on position and expanding the initial group 404a based on a measure of similarity based on capture time, the parallel model processing system 800 can utilize a measure of similarity that reflects either or both of capture time and capture position to identify the initial group 404a and/or to expand the initial group 404a. For instance, the parallel model processing system 800 can expand the initial group 404a based on an overlap threshold that comprises both a distance and a time. For example, the parallel model processing system 800 can apply an overlap threshold that adds common digital aerial images that are within a certain distance and within a certain time of the digital aerial images in the initial group 404a.

In addition, although the captures times 502a-502n appear uniformly distributed across the timeline 500 in FIGS. 5A-5C, capture times are frequently unevenly distributed with respect to time. The parallel model processing system can identify initial groups and/or clusters based on capture times regardless of a particular distribution of capture times.

Figure 6A:
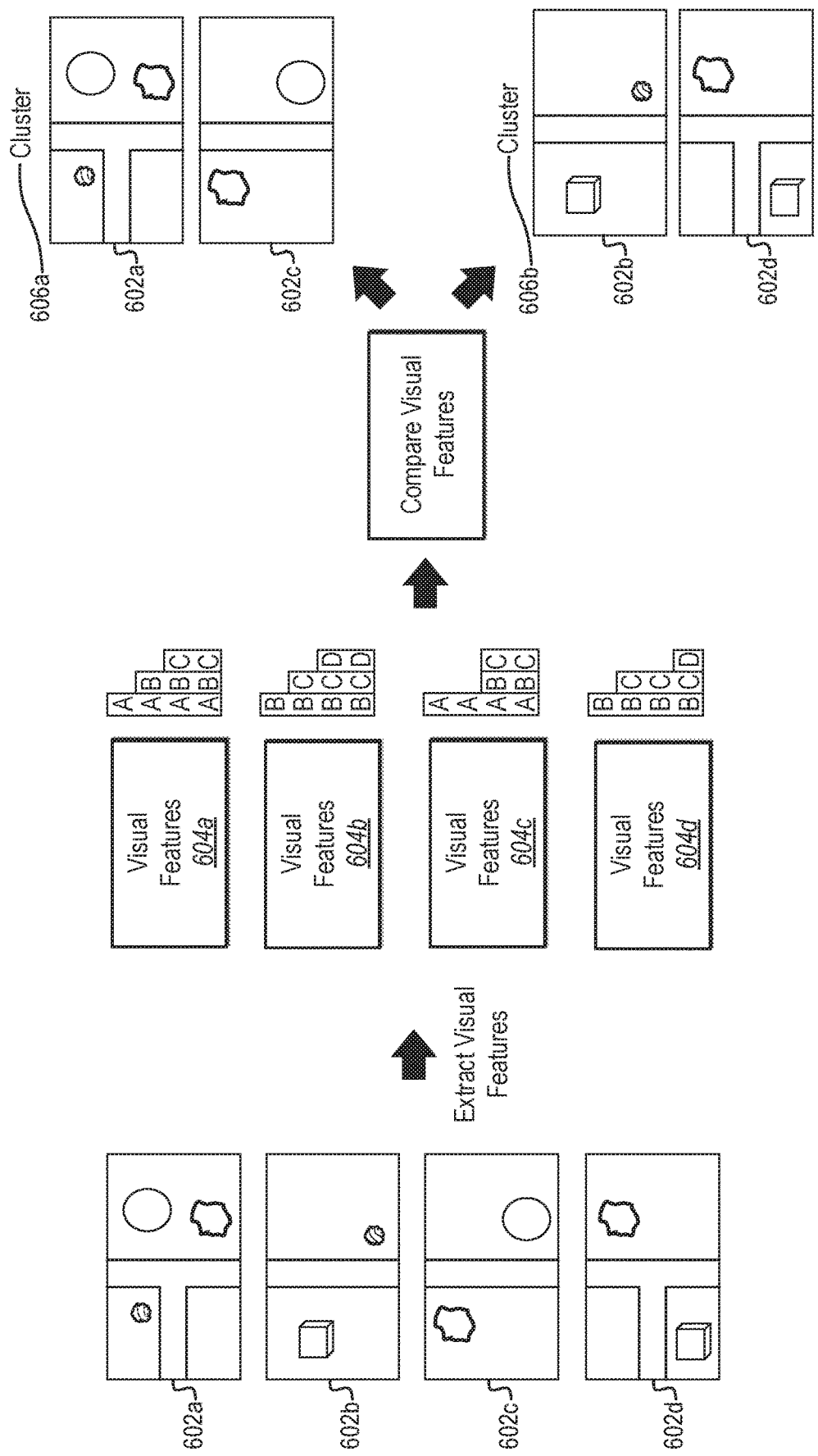

As discussed above, the parallel model processing system 800 can also identify clusters utilizing a measure of similarity based on visual content of digital aerial images. In particular, the parallel model processing system 800 can compare visual content of digital aerial images and cluster the digital aerial images based on the comparison. For example, FIG. 6A illustrates a plurality of digital aerial images 602a-602n of a site. The parallel model processing system 800 can analyze the visual content (e.g., pixels) of the digital aerial images 602a-602n and generate initial groups and/or clusters based on the visual content of the digital aerial images 602a-602n.

The parallel model processing system 800 can utilize a variety of different approaches to analyze and compare visual content of digital aerial images in generating clusters. For example, in one or more embodiments, the parallel model processing system 800 utilizes object recognition algorithms and/or image similarity algorithms to analyze pixels of digital aerial images and identify digital aerial images portraying corresponding visual content. To illustrate, the parallel model processing system 800 can utilize object recognition algorithms to analyze pixels of digital aerial images, identify features (e.g., physical objects or items) portrayed in the digital aerial images, and generate clusters based on the digital aerial images portraying the same or similar features (e.g., the same physical objects or items).

Similarly, in one or more embodiments, the parallel model processing system 800 identifies features comprising colors of pixels within each digital aerial image. Moreover, the parallel model processing system 800 generates histograms for each digital aerial image, where the histograms reflect the number (or percentage) of pixels corresponding to particular colors. The parallel model processing system 800 can then compare the pixel histograms of digital aerial images to identify similar digital aerial images and generate clusters.

Furthermore, as mentioned above, in one or more embodiments, the parallel model processing system 800 utilizes machine learning (such as a neural network) to identify and compare features of digital aerial images. For example, the parallel model processing system 800 can train a neural network based on a repository of similar digital aerial images to identify similar images. Specifically, the parallel model processing system 800 can utilize a neural network to generate feature vectors for the plurality of digital aerial images and then compare the feature vectors to generate the clusters.

In other embodiments, the parallel model processing system 800 utilizes a bag of visual words algorithm to compare visual features. For example, the parallel model processing system 800 can utilize a bag of words algorithm to analyze a digital aerial image and generate visual words of the digital aerial image. The parallel model processing system 800 can then utilize the visual words to compare digital aerial images. In this manner, the visual words can comprise a measure of similarity. Visual words are a set of visual features utilized by a bag of visual words algorithm. Specifically, a bag of words algorithm can identify a set of visual features (i.e., visual words) that correspond to portions of visual content portrayed in a digital image. Thus, as a human may use a word (i.e., apple) to describe a portion of a visual content portrayed in a digital image, a bag of visual words algorithm can utilize a visual word (i.e., a set of features) to describe a portion of visual content portrayed in an image (even though the "visual word" may not correlate to a word utilized in any human language).

In one or more embodiments, the parallel model processing system 800 utilizes a bag of visual words algorithm to analyze a digital aerial image and generate visual words. For example, the parallel model processing system 800 can analyze a digital aerial image and generate a histogram of visual words for each digital aerial image (e.g., a histogram for the number of times a digital aerial image reflects a particular visual word). The parallel model processing system 800 can then compare digital aerial images by comparing the histogram of visual words.

For example, FIG. 6A illustrates utilizing visual content to identify a cluster in accordance with one or more embodiments. In particular, the parallel model processing system 800 extracts visual features from the plurality of digital aerial images 602a-602n. Specifically, the parallel model processing system 800 extracts sets of visual features 604a-604n. In relation to the embodiment shown in FIG. 6A, the visual features comprise visual words (although the parallel model processing system 800 can utilize a variety of visual features as discussed above). Specifically, the parallel model processing system 800 extracts visual words and creates a histogram of the visual words for each digital aerial image (illustrated as a histogram of visual words A, B, C, and/or D in FIG. 6A).

As shown in FIG. 6A, the parallel model processing system 800 can also compare the visual features to generate clusters 606a, 606b. For example, the parallel model processing system 800 can compare histograms of visual words utilizing a clustering algorithm and/or graph partitioning algorithm to generate the clusters 606a, 606n.

Although not illustrated in FIG. 6A, the parallel model processing system 800 can also utilize visual features to expand an initial group of digital aerial images to generate a cluster. For example, the parallel model processing system 800 can compare visual features to generate initial groups of digital aerial images. The parallel model processing system 800 can then expand the initial groups of digital aerial images by adding common digital aerial images based on visual content. In particular, the parallel model processing system 800 can further analyze visual features and add digital aerial images to an initial group that are the most similar to other digital aerial images in the initial group.

As mentioned above, measures of similarity utilized to generate clusters can comprise a variety of different values. In relation to FIG. 6A, for example, the parallel model processing system 800 utilizes visual words (or histograms of visual words) as measures of similarity. In other embodiments, the parallel model processing system 800 can utilize feature vectors as measures of similarity. In other embodiments, the parallel model processing system 800 can utilize another value (e.g., classification probability between two objects in two different images) as a measure of similarity.

As mentioned above, the parallel model processing system 800 can also utilize a measure of similarity based on object recognition techniques to identify clusters. For example, FIG. 6B illustrates an initial group 604a generated based on the visual content (e.g., by comparing pixels) of the plurality of digital aerial images 602a-602n. In particular, the parallel model processing system 800 identifies digital aerial images portraying an object 606 (i.e., a circular structure) and generates the initial group based on a determination that each of the digital aerial images portrays the object 606.

In addition to generating initial groups based on digital aerial image content, the parallel model processing system 800 can also expand initial groups based on object recognition technology. For example, the parallel model processing system 800 can expand the initial group 604a by adding any digital aerial images that also portray the object 608 (i.e., a particular tree). In this manner, the parallel model processing system can generate a plurality of clusters based on the digital aerial images 602a-602n

The parallel model processing system 800 can also utilize the visual content of digital aerial images in conjunction with capture time and/or capture position to generate clusters. For example, FIG. 6C illustrates utilizing both capture time and the content of digital aerial images to generate a cluster. In particular, FIG. 6C illustrates the capture positions 402a-402n on the site 400 with the initial group 404b. The parallel model processing system 800 expands the initial group 404b to generate a cluster 610 by identifying common digital aerial images based on the contents of the digital aerial images.

In particular, the parallel model processing system 800 identifies digital aerial images portraying objects also portrayed by the digital aerial images in the initial group 404b. The parallel model processing system adds the identified digital aerial images as common digital aerial images in the cluster 610. Similarly, the parallel model processing system 800 can also identify digital aerial images with similar histograms to digital aerial images in the initial group 404b and add the identified aerial images as common digital aerial images in the cluster 610.

Although FIGS. 4A-6D illustrate exemplary embodiments utilizing capture position, capture time, and/or contents of digital aerial images to identify initial groups and clusters, the parallel model processing system can utilize capture position, capture time, contents of digital aerial images and/or other factors in isolation or in any variety of combinations to identify initial groups and/or clusters. Indeed, in some embodiments, the parallel model processing system utilizes all three of capture position, capture time, and digital aerial image visual content to identify initial groups and/or clusters. Indeed, the parallel model processing system 800 can generate a measure of similarity that combines capture position, capture time, and/or visual content of digital aerial images.

For example, FIGS. 7A-7C illustrate utilizing a measure of similarity based on capture position, capture time, and visual content to identify initial groups and clusters. Specifically, FIG. 7A illustrates a plurality of digital aerial images 702a-702n. The parallel model processing system analyzes capture position, capture time, and visual content of the plurality of digital aerial images 702a-702n to generate initial groups 704a-704d (as illustrated in FIG. 7B).

For example, the parallel model processing system 800 can apply a clustering algorithm and/or a graph partition algorithm to generate the initial groups 704a-704d. For instance, the parallel model processing system 800 can utilize a graph partitioning algorithm to measure edges (e.g., spikes or valleys) in one or more measures of similarity to determine cuts for partitioning the digital aerial images. To illustrate, the parallel model processing system 800 can generate an overall measure of similarity that reflects differences in capture position, capture time, and visual content of the plurality of digital aerial images 702a-702n. For instance, the parallel model processing system 800 can create a unit (e.g., normalized) measure of similarity for each of capture position, capture time, and visual content and then combine the individual measures of similarity to generate an overall measure of similarity. The parallel model processing system 800 can then analyze the overall measure of similarity to identify edges and generate partitions.

By considering a measure of similarity that is based on multiple different factors, the parallel model processing system 800 can generate initial groups (and/or clusters) that are likely to contain similar digital aerial images. As shown in FIG. 7B, the initial groups may not be uniform. Indeed, the factors of capture position, capture time, and visual contents may weigh in favor of different groups. That said, the resulting initial graphs reflect a high likelihood that the digital aerial images are similar (e.g., portray a particular region), and therefore more easy to analyze, combine, and/or merge.

Although the foregoing example references generating an overall measure of similarity, the parallel model processing system 800 can also analyze individual measures of similarity to generate edges. For example, the parallel model processing system 800 can apply a partitioning algorithm that considers three separate measures of similarity in determining edges and partitions.

As shown in FIG. 7C, the parallel model processing system 800 can also utilize a measure of similarity that considers capture position, capture time, and visual content in expanding an initial graph. In particular, in relation to FIG. 7C, the parallel model processing system 800 applies an overlap threshold comprising a minimum number of digital aerial images to expand the initial group 704c. The parallel model processing system 800 analyzes a measure of similarity corresponding to capture position, capture time, and visual content to determine additional digital aerial images 706a-706c that are most similar to the digital aerial images in the initial group 704c. The parallel model processing system 800 then adds the additional digital aerial images 706a-706c to the initial group 704c to generate a cluster 708. In this manner, the parallel model processing system 800 can utilize a measure of similarity based on multiple different factors to determine initial groups and expand initial groups to generate clusters.

Figure 8:
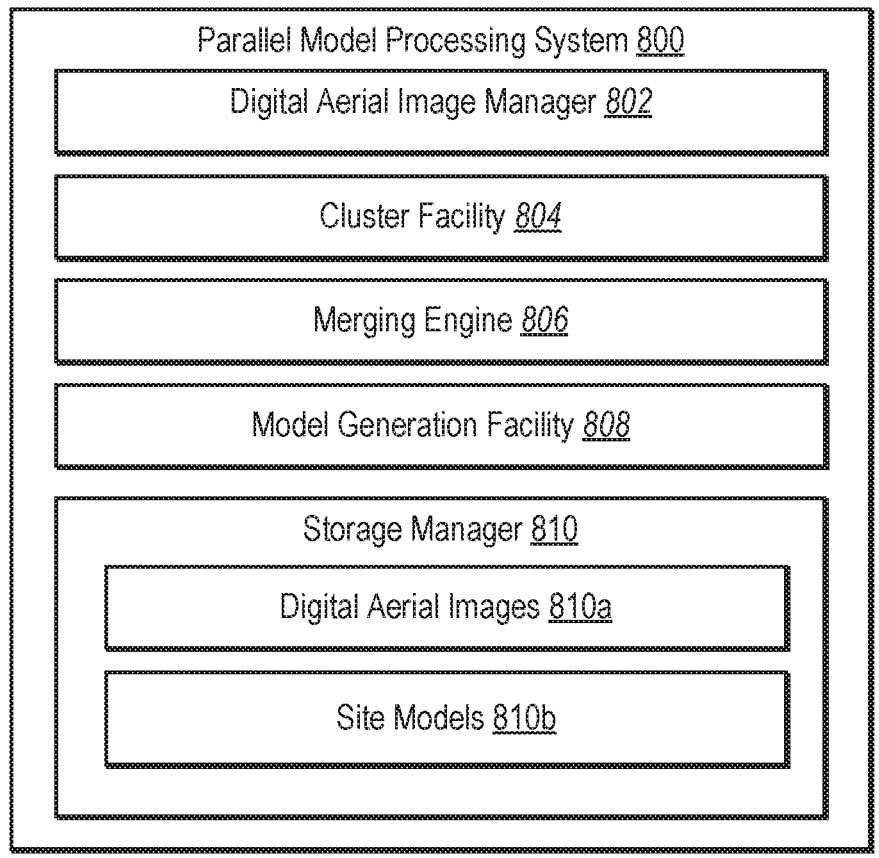
FIG. 8 illustrates a schematic diagram of a parallel model processing system in accordance with one or more embodiments.

Turning now to FIG. 8, additional detail will be provided regarding components and capabilities of one or more embodiments of the parallel model processing system 800. In particular, FIG. 8 shows a schematic diagram illustrating an example embodiment of the parallel model processing system 800. As shown in FIG. 8, in one or more embodiments, the parallel model processing system 800 includes a digital aerial image manager 802, a cluster facility 804, a merging engine 806, a model generation facility 808, and a storage manager 810 (comprising digital aerial images 810a and site models 810b).

As just mentioned, and as illustrated in FIG. 8, the parallel model processing system 800 includes the digital aerial image manager 802. The digital aerial image manager 802 can obtain, capture, receive, and/or identify digital aerial images. For instance, the digital aerial image manager 802 can capture or receive (e.g., via a UAV) digital aerial images of a site. Moreover, the digital aerial image manager 802 can obtain, capture, receive, and/or identify data corresponding to digital aerial images. For example, the digital aerial image manager 802 can access capture positions or capture times corresponding to digital aerial images (e.g., camera positions determined by GPS or capture times determined by a camera capturing the digital aerial images).

Moreover, as shown in FIG. 8, the parallel model processing system 800 includes the cluster facility 804. The cluster facility 804 can identify, generate, determine, or calculate one or more clusters. For example, the cluster facility 804 can identify clusters of digital aerial images from a plurality of digital aerial images of a site. Similarly, the cluster facility 804 can identify clusters of three-dimensional data points from a three-dimensional representation of a site. As discussed above, the parallel model processing system 800 can identify clusters based on a variety of factors, such as capture position, capture time, or contents of digital aerial images. In particular, the cluster facility 804 can determine one or more measures of similarity between digital aerial images (and/or points) and generate clusters based on the one or more measures of similarity.

In addition, as illustrated in FIG. 8, the parallel model processing system 800 includes the merging engine 806. The merging engine 806 can merge, combine, join and/or align, clusters of data. For example, the merging engine 806 can combine cluster three-dimensional representations of a site (e.g., initial three-dimensional representations, densified three-dimensional representations, or full three-dimensional representations). Similarly, the merging engine 806 can combine digital aerial images or other clusters of data.

As shown in FIG. 8, in addition to the merging engine 806, the parallel model processing system 800 also includes the model generation facility 808. The model generation facility 808 can generate a site model from digital aerial images. In particular, the model generation facility 808 can perform a plurality of acts of a model generation pipeline (e.g., the model generation pipeline 100) to generate a site model.

As described above, the model generation facility 808 can utilize various devices to generate site models (i.e., perform a model generation pipeline). In particular, the model generation facility 808 can select a client device or a plurality of computing devices (e.g., a cloud computing network) to perform particular acts of the model generation pipeline. The model generation facility 808 can send clusters (e.g., from the cluster facility 804) to a cloud computing network and utilize the cloud computing network for independent analysis of each of the clusters. Moreover, the model generation facility 808 can utilize a client device to analyze merged site models (e.g., from the merging engine 806).

Moreover, as illustrated in FIG. 8, the parallel model processing system 800 also includes the storage manager 810. The storage manager 810 maintains data for the parallel model processing system 800. The storage manager 810 can maintain data of any type, size, or kind, as necessary to perform the functions of the parallel model processing system 800. For instance, as shown in FIG. 8, the storage manager 810 includes digital aerial images 810a (e.g., a plurality of digital aerial images of a site), and site models 810b (e.g., initial three-dimensional representations, georeferenced three-dimensional representations, refined three-dimensional representations, densified three-dimensional representations, full three-dimensional representations, or orthomaps).

Each of the components 802-810 of the parallel model processing system 800 and their corresponding elements may be in communication with one another using any suitable communication technologies. It will be recognized that although components 802-810 are shown to be separate in FIG. 8, any of components 802-810 may be combined into fewer components (such as into a single component), divided into more components, or configured into different components as may serve a particular embodiment. Moreover, one or more embodiments of the parallel model processing system 800 may include additional components or fewer components than those illustrated in FIG. 8.

The components 802-810 and their corresponding elements can comprise software, hardware, or both. For example, the components 802-810 and their corresponding elements can comprise one or more instructions stored on a computer-readable storage medium and executable by processors of one or more computing devices. When executed by the one or more processors, the computer-executable instructions of the parallel model processing system 800 can cause one or more computing systems (e.g., one or more server devices) to perform the methods and provide the functionality described herein. Alternatively, the components 802-810 can comprise hardware, such as a special purpose processing device to perform a certain function or group of functions. Moreover, the components 802-810 can comprise a combination of computer-executable instructions and hardware.

Furthermore, the components 802-810 of the parallel model processing system 800 and their corresponding elements may, for example, be implemented as one or more stand-alone applications, as one or more modules of an application, as one or more plug-ins, as one or more library functions or functions that may be called by other applications, and/or as a cloud-computing model. Thus, components 802-810 of the parallel model processing system 800 and their corresponding elements may be implemented as one or more stand-alone applications, such as a desktop or mobile application. Furthermore, the components 802-810 of the parallel model processing system 800 may be implemented as one or more web-based applications hosted on a remote server. Moreover, the components of the parallel model processing system 800 may be implemented in a suite of mobile device applications or "apps."

Figure 9:
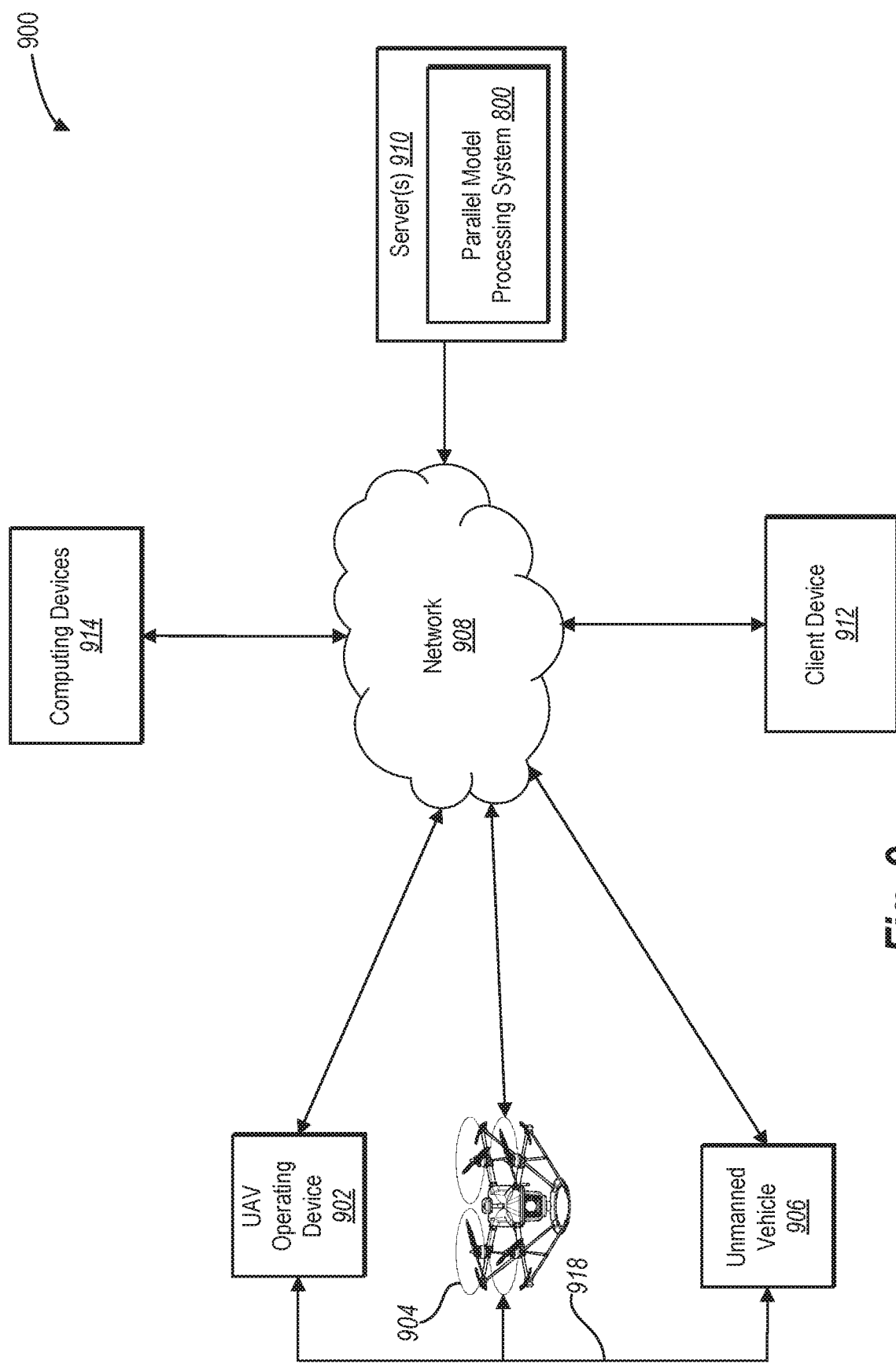
FIG. 9 illustrates a schematic diagram of a network environment in which the methods and systems disclosed herein may be implemented in accordance with one or more embodiments.

Turning now to FIG. 9, further information will be provided regarding implementation of the parallel model processing system 800. Specifically, FIG. 9 illustrates a schematic diagram of one embodiment of an exemplary system environment ("environment") 900 in which the parallel model processing system 800 can operate. As illustrated in FIG. 9, the environment 900 can include a UAV operating device 902, a UAV 904, an unmanned vehicle 906, a network 908, server(s) 910, a client device 912, and computing devices 914. The UAV operating device 902, the UAV 904, the unmanned vehicle 906, the network 908, the server(s) 910, the client device 912, and/or the computing devices 914 may be communicatively coupled with each other either directly or indirectly. The UAV operating device 902, the UAV 904, the unmanned vehicle 906, the network 908, the server(s) 910, the client device 912, and/or the computing devices 914 may communicate using any communication platforms and technologies suitable for transporting data and/or communication signals, including any known communication technologies, devices, media, and protocols supportive of remote data communications, examples of which will be described in more detail below with respect to FIG. 11.

As just mentioned, and as illustrated in FIG. 9, the environment 900 can include the UAV operating device 902, the client device 912, and the computing devices 914. The UAV operating device 902, the client device 912, and the computing devices 914 may comprise any type of computing devices. For example, the UAV operating device 902, the client device 912, and the computing devices 914 may comprise one or more personal computers, laptop computers, mobile devices, mobile phones, tablets, special purpose computers, TVs, or other computing devices. In one or more embodiments, a pilot may utilize the UAV operating device 902 to locally control and/or communicate with the UAV 904 and/or the unmanned vehicle 906. Moreover, in one or more embodiments, the client device 912 (i.e., one exemplary embodiment of the client devices 202, 302) comprises a terminal computer that receives user input from a user and provides one or more user interfaces for display via display device to a user. In addition, in one or more embodiments, the computing devices 914 (i.e., one exemplary embodiment of the plurality of computing devices 204, 304) comprise cloud computing servers providing virtual computing services. The UAV operating device 902 and/or the client device 912 may comprise one or more computing devices as discussed in greater detail below with regard to FIG. 11.

Moreover, FIG. 9 also illustrates that the environment 900 can include the UAV 904, which represents one example embodiment of the UAV 102. As described above, the UAV 904 can comprise any type of unmanned aerial vehicle. Moreover, the UAV 904 can include a camera capable of capturing digital aerial images. In at least one embodiment, the UAV 904 is a multi-rotor vehicle, such as a quadcopter, and includes a carbon fiber shell, integrated electronics, a battery bay, a global positioning system ("GPS") receiver, a fixed or swappable imaging system (e.g., a digital camera), and various additional sensors and/or receivers.

As shown in FIG. 9, the environment 900 may include the unmanned vehicle 906. As described above, the unmanned vehicle 906 can comprise a variety of different vehicles that perform functions autonomously or via a remote operator. The unmanned vehicle 906 can include a camera affixed to a vehicle (e.g., crane or backhoe) that can capture digital aerial images autonomously or by remote operation. Digital aerial images captured by the UAV and/or the unmanned vehicle 906 can be utilized to generate a model of a site.

Although not illustrated, in some embodiments, the environment 900 also includes a remote station. For example, the environment 900 may utilize a remote station to land, store, charge, guide, track, or repair the UAV 904. In particular, in one or more embodiments, the remote station can charge or replace batteries exhausted by the UAV 904 during flight. Moreover, the remote station may be utilized to communicate with the UAV 904 prior to, during, or after a flight.

Furthermore, the remote station can comprise an RTK station capable of receiving and analyzing RTK network data.

As illustrated in FIG. 9, the UAV operating device 902, the UAV 904, the unmanned vehicle 906, the network 908, the server(s) 910, the client device 912, and/or the computing devices 914 may communicate via the network 908. The network 908 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 908 may be any suitable network over which the UAV operating device 902, the client device 912, the computing devices 914 (or other components) may access the server(s) 910 or vice versa. The network 908 will be discussed in more detail below with regard to FIG. 11.

Moreover, as illustrated in FIG. 9, the environment 900 also includes the server(s) 910. The server(s) 910 may generate, store, receive, and/or transmit any type of data, including digital aerial images 810a and site models 810b. For example, the server(s) 910 can receive data from the UAV operating device 902, the UAV 904, the unmanned vehicle 906, the client device 912, and/or the computing devices 914. In one example embodiment, the server(s) 910 comprise a data server. The server(s) 910 can also comprise a communication server or a web-hosting server. Additional details regarding the server(s) 910 will be discussed below with respect to FIG. 11.

Although FIG. 9 illustrates a particular number of each of the UAV operating device 902, the UAV 904, the unmanned vehicle 906, the network 908, the server(s) 910, the client device 912, and/or the computing devices 914, it will be appreciated that the UAV operating device 902, the UAV 904, the unmanned vehicle 906, the network 908, the server(s) 910, the client device 912, and/or the computing devices 914 can represent any number of computing devices, UAVs, or vehicles (fewer or greater than shown). Similarly, although FIG. 9 illustrates a particular arrangement of the UAV operating device 902, the UAV 904, the unmanned vehicles 906, the network 908, the server(s) 910, the client device 912, and/or the computing devices 914 various additional arrangements are possible.

For example, the UAV operating device 902, the UAV 904, and the unmanned vehicle 906 (or other components) may communicate directly one with another via a local connection 918. The local connection 918 may comprise any recognized form of wired or wireless communication. For example, in one or more embodiments the UAV operating device 902 may include a mobile computing device (e.g., tablet) utilized by a UAV operator to communicate with the UAV 904 and the unmanned vehicle 906 using BLUETOOTH technology.

By way of an additional example, in one or more embodiments, the UAV 904 and the unmanned vehicle 906 capture a plurality of digital aerial images of a site (e.g., via the digital aerial image manager 802). Moreover, the UAV 904 and the unmanned vehicle 906 transmit the plurality of digital aerial images of the site to the server(s) 910 (e.g., via the UAV operating device 902). The server(s) 910 store the plurality of digital aerial images of the site (e.g., via the storage manager 810). In response to user interaction and user input received from the client device 912, the server(s) 910 provide the plurality of digital aerial images to the client device 912. The client device 912 analyzes the digital aerial images and generates a model of the site (e.g., via the model generation facility 808). In particular, the client device 912 selects acts of a model generation pipeline to perform at the client device 912 and acts to perform at the computing devices 914 (e.g., via the model generation facility 808). The client device 912 generates clusters and sends the clusters to the computing devices 914 (e.g., via the cluster facility 804). The computing devices 914 analyze the clusters and generate cluster models (e.g., via the model generation facility 808). The computing devices 914 provide the cluster models to the client device 912. The client device 912 merges the cluster models to generate a final site model (e.g., via the merging engine 806 and/or the model generation facility 808). Moreover, the client device 912 provides the final site model for display to a user via a display screen of the client device 912 (e.g., via the model generation facility 808).

As illustrated by the previous example embodiments, the parallel model processing system 800 may be implemented in whole, or in part, by the individual elements 902-910 of the environment 900. Although the previous examples describe certain components of the parallel model processing system 800 implemented with regard to certain elements of the environment 900, it will be appreciated that components of the parallel model processing system 800 can be implemented in any of the elements of the environment 900. For example, the parallel model processing system 800 may be implemented entirely on the client device 912. Similarly, the parallel model processing system 800 may be implemented on the UAV 904, the unmanned vehicle 906, and/or the server(s) 910. Moreover, different components and functions of the parallel model processing system 800 may be implemented separately among the UAV operating device 902, the UAV 904, the unmanned vehicle 906, the network 908, the server(s) 910, the client device 912, and/or the computing devices 914.

Figure 10:
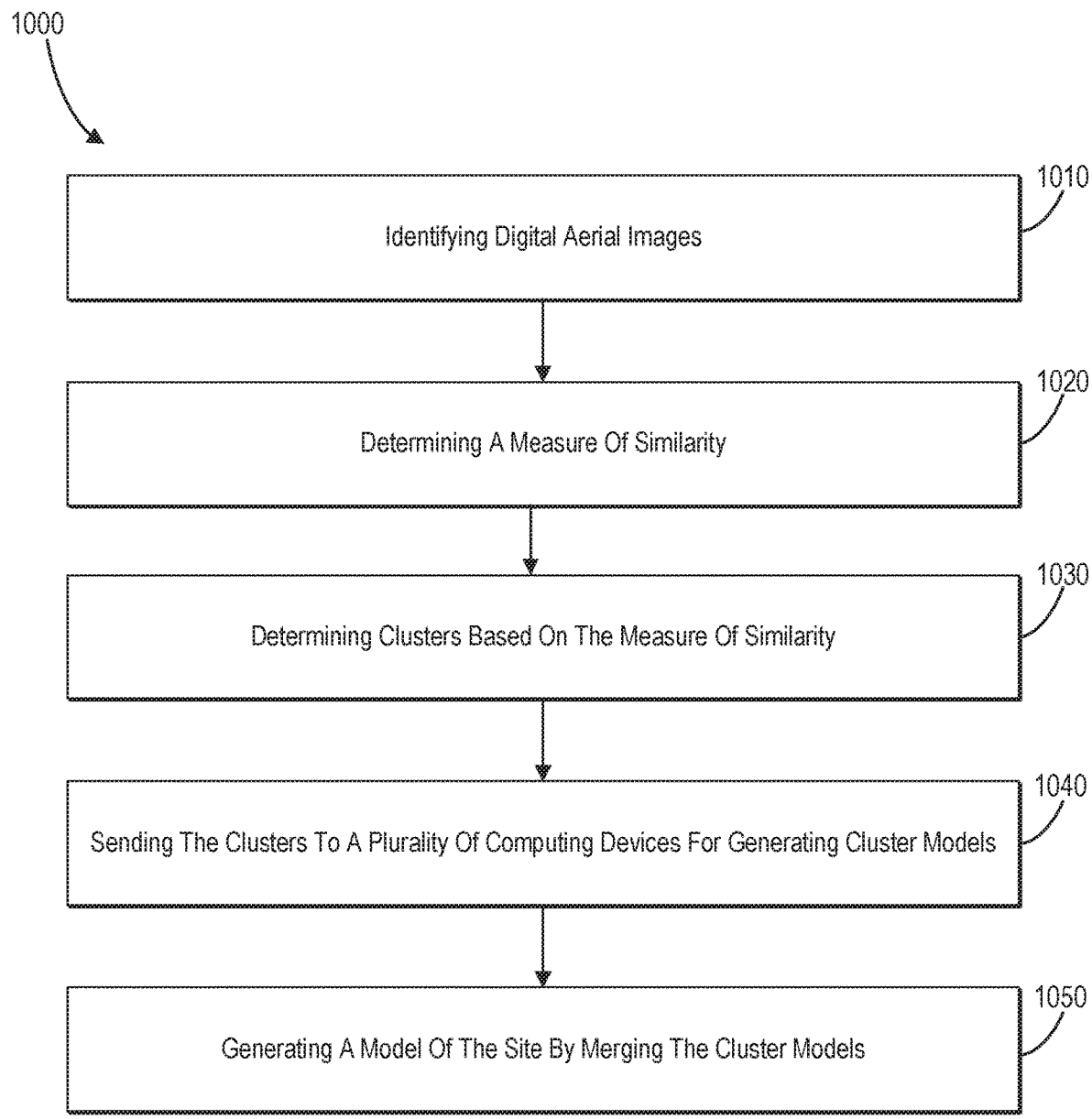
FIG. 10 illustrates a flowchart of a series of acts in a method of generating a site model from digital aerial images captured by a UAV in accordance with one or more embodiments.

FIGS. 1-9, the corresponding text, and the examples, provide a number of different systems and devices for generating site models utilizing digital aerial images. In addition to the foregoing, one or more embodiments can also be described in terms of acts for accomplishing a particular result. For example, FIG. 10 illustrates a flowchart of a series of acts 1000 of parallel processing of digital aerial images to generate a site model in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10.

As illustrated, the series of acts 1000 includes an act 1010 of identifying digital aerial images. In particular, the act 1010 can include identifying (a plurality of) digital aerial images of a site captured by at least one UAV. The act 1010 can also include identifying digital aerial images of the site captured by at least one unmanned vehicle.

As shown in FIG. 10, the series of acts 1000 also includes an act 1020 of determining a measure of similarity. In particular, the act 1020 can include determining a measure of similarity between the digital aerial images. For example, the act 1020 can include determining the measure of similarity based on the capture positions of the digital aerial images. Moreover, the act 1020 can include, determining the measure of similarity based on the capture times of the digital aerial images. Furthermore, the act 1020 can include determining the measure of similarity based on visual features generated from visual content portrayed in the digital aerial images.

In addition, as illustrated in FIG. 10, the series of acts 1000 also includes an act 1030 of determining clusters based on the measure of similarity. In particular, the act 1030 can include determining clusters of the digital aerial images based on the measure of similarity between the digital aerial images. For example, in one or more embodiments, the act 1030 includes determining the clusters of the digital aerial images based on the capture positions of the digital aerial images (or determining clusters of the digital aerial images by analyzing, for each digital aerial image, a capture position of the digital aerial image). Moreover, the act 1030 can also include determining the clusters of the digital aerial images based on the capture times of the digital aerial images (or for each of the plurality of digital aerial images, determining a capture time for the digital aerial image). Furthermore, the act 1030 can also include determining the clusters of the digital aerial images based on the visual features (or determine clusters of the digital aerial images by analyzing, for each digital aerial image, visual content portrayed in the digital aerial image).

In one or more embodiments, analyzing the visual content comprises determining a first set of features from visual content portrayed in a first digital aerial image of the plurality of digital aerial images and a second set of features from visual content portrayed in a second digital aerial image of the plurality of digital aerial images; and comparing the first set of features from visual content portrayed in the first digital aerial image with the second set of features from visual content portrayed in the second digital aerial image to determine the clusters. Moreover, in one or more embodiments, the act 1030 includes comparing visual content portrayed in a first digital aerial image and visual content portrayed in a second digital aerial image; and determining the clusters based on the comparison between the visual content portrayed in the first digital aerial image and the visual content portrayed in the second digital aerial image.

In one or more embodiments, the act 1030 also includes identifying initial groups of digital aerial images based on the measure of similarity; and expanding the initial groups of digital aerial images to include common digital aerial images, the common digital aerial images belonging to at least two of the initial groups. Moreover, expanding the initial groups of digital aerial images to include the common digital aerial images comprises: determining at least one of a capture time or capture position for a digital aerial image of the digital aerial images; and selecting the digital aerial image as one of the common digital aerial images based on at least one of the capture time or the capture position for the digital aerial image. In addition, expanding the initial groups of digital aerial images to include the common digital aerial images can also include: identifying an overlap threshold, wherein the overlap threshold comprises at least one of a distance, a time period, or a number of common digital images; and expanding the initial groups of digital aerial images until the overlap threshold is satisfied.

Moreover, in one or more embodiments, expanding the initial groups of digital aerial images to include the common digital aerial images comprises: generating a first histogram of visual features for a first digital aerial image in a first initial group of digital aerial images from the initial groups of digital aerial images and a second histogram of visual features for a second digital aerial image in a second initial group of digital aerial images from the initial groups of digital aerial images; and adding the second digital aerial image to the first initial group of digital aerial images as one of the common digital aerial images based on a comparison between the first histogram of visual features for the first digital aerial image in the first initial group and the second histogram of visual features for the second digital aerial image in the second initial group.

In one or more embodiments, the act 1030 also includes identifying initial groups of digital aerial images based on the capture positions; and generating the clusters by expanding the initial groups of digital aerial images to include common digital aerial images.

As illustrated in FIG. 10, the series of acts 1000 also includes an act 1040 of sending the clusters to a plurality of computing devices for generating cluster models. In particular, the act 1040 can include sending the clusters of the plurality of digital aerial images to a plurality of computing devices for generating cluster models corresponding to the clusters of the plurality of digital aerial images, wherein the cluster models comprise a plurality of points reflecting the site.

Further, as shown in FIG. 10, the series of acts 1000 also includes an act 1050 of generating a model of the site by merging the cluster models. In particular, the act 1050 can include generating a model of the site by merging the cluster models using the plurality of points. For example, in one or more embodiments, the act 1050 includes merging the cluster models based on the common digital aerial images. Moreover, the act 1050 can also include in response to receiving the cluster models from the plurality of computing devices, merging the cluster models; and generating a model of the site based on the merged cluster models. For example, in one or more embodiments, merging the cluster models comprises merging the cluster models based on the common digital aerial images; and the model of the site comprises at least one of a three-dimensional representation of the site or an orthomap. Moreover, in one or more embodiments, generating cluster models comprises, for each cluster, generating a cluster three-dimensional representation comprising a plurality of cluster three-dimensional points; and merging the analyzed clusters comprises: identifying common cluster three-dimensional points between two or more cluster three-dimensional representations; and merging the two or more cluster three-dimensional representations based on the common cluster three-dimensional points.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
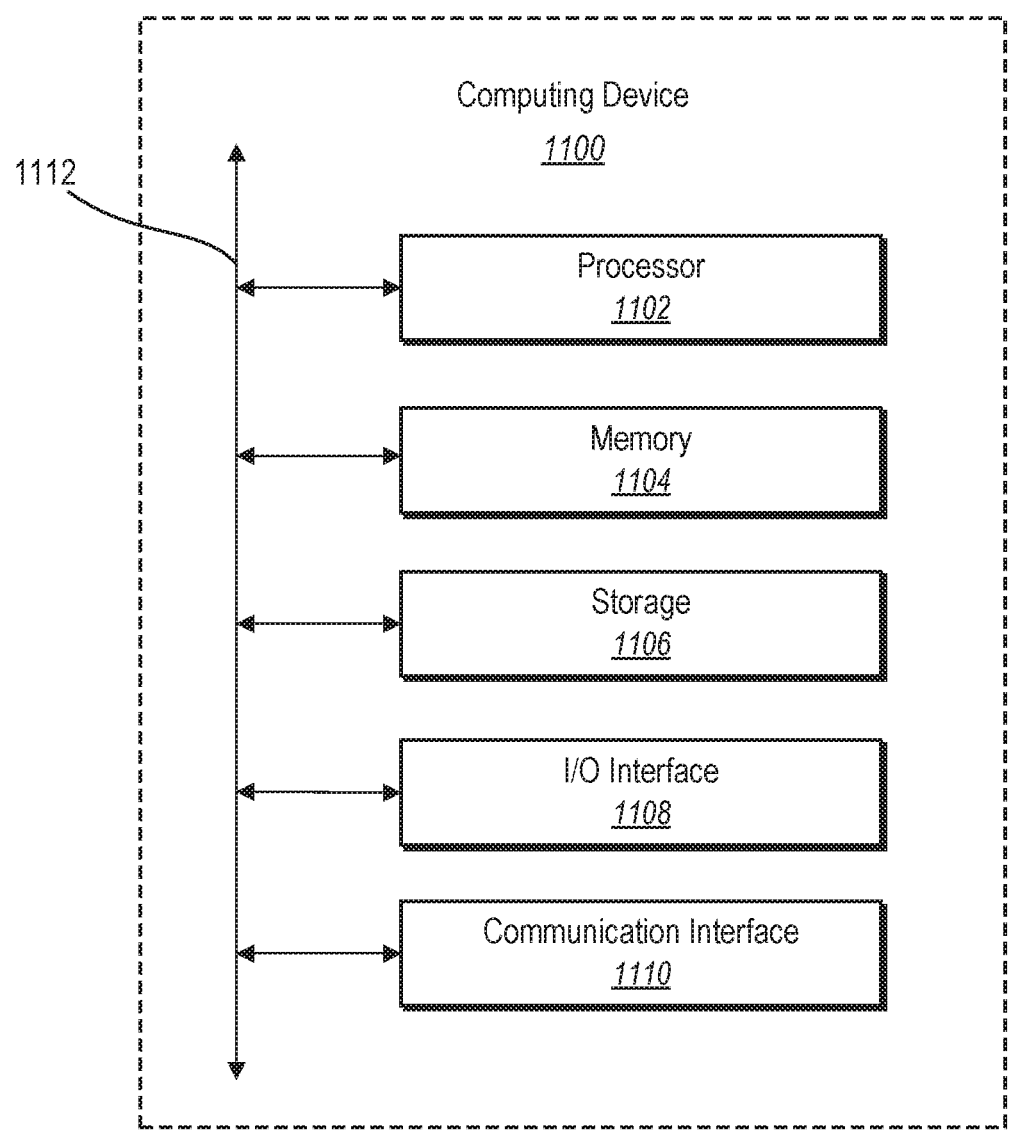
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that the parallel model processing system 800 can comprise implementations of the computing device 1100 (e.g., the UAV 102, the computing device 202, the computing devices 204, the computing device 302, the computing devices 304, the UAV operating device 902, the UAV 904, the unmanned vehicle 906, the computing devices 914, the client device 912, and/or the server(s) 910. As shown by FIG. 11, the computing device can comprise a processor 1102, memory 1104, a storage device 1106, an I/O interface 1108, and a communication interface 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a stylus or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A system comprising:
at least one processor; and
at least one non-transitory computer readable storage medium storing instructions thereon that, when executed by the at least one processor, cause the system to:
identify digital aerial images of a site captured by at least one unmanned aerial vehicle;
perform, at a client device, at least one of feature detection, feature matching, three-dimensional representation generation, or georeferencing;
upon performing, at the client device at least one of the feature detection, the feature matching, the three-dimensional representation generation, or the georeferencing, perform parallel processing of the digital aerial images of the site by:
determining a measure of similarity between the digital aerial images;
determining parallel processing clusters of the digital aerial images based on the measure of similarity between the digital aerial images; and
sending the parallel processing clusters of the digital aerial images to a plurality of computing devices, that do not include the client device, for:
performing, in parallel across the plurality of computing devices, at least one of cluster feature matching, cluster three-dimensional representation generation, cluster georeferencing, cluster three-dimensional representation refinement, cluster densification, cluster three-dimensional representation reconstruction, or cluster rendering in relation to the parallel processing clusters; and
generating cluster models corresponding to the parallel processing clusters of the digital aerial images in parallel across the plurality of computing devices, wherein the cluster models comprise a plurality of points reflecting the site; and
generate a model of the site by merging the cluster models generated in parallel across the plurality of computing devices using the plurality of points.

2. The system of claim 1, further comprising instructions that, when executed by the at least one processor, cause the system to:
determine the measure of similarity based on capture positions of the digital aerial images; and
determine the parallel processing clusters of the digital aerial images based on the capture positions of the digital aerial images.

3. The system of claim 1, further comprising instructions that, when executed by the at least one processor, cause the system to:
determine the measure of similarity based on capture times of the digital aerial images; and
determine the parallel processing clusters of the digital aerial images based on the capture times of the digital aerial images.

4. The system of claim 1, further comprising instructions that, when executed by the at least one processor, cause the system to:

determine the measure of similarity based on visual features generated from visual content portrayed in the digital aerial images; and determine the parallel processing clusters of the digital aerial images based on the visual features.

5. The system of claim 1, further comprising instructions that, when executed by the at least one processor, cause the system to determine the parallel processing clusters of the digital aerial images by:

dividing the digital aerial images into initial parallel processing clusters of digital aerial images based on the measure of similarity; and adding common digital aerial images to the initial parallel processing clusters to generate the parallel processing clusters of the digital aerial images, each of the common digital aerial images belonging to at least two of the parallel processing clusters.

6. The system of claim 5, wherein adding the common digital aerial image to the initial parallel processing clusters to generate the parallel processing clusters comprises:

determining at least one of a capture time or capture position for a digital aerial image of the digital aerial images; and selecting the digital aerial image as one of the common digital aerial images for at least two of the parallel processing clusters based on at least one of the capture time or the capture position for the digital aerial image.

7. The system of claim 5, wherein adding the common digital aerial images to the initial parallel processing clusters to generate the parallel processing clusters comprises:

generating a first histogram of visual features for a first digital aerial image in a first initial parallel processing cluster from the initial parallel processing clusters of digital aerial images and a second histogram of visual features for a second digital aerial image in a second initial parallel processing cluster of digital aerial images from the initial parallel processing clusters of digital aerial images; and adding the second digital aerial image in the second initial parallel processing cluster to the first initial parallel processing cluster of digital aerial images as one of the common digital aerial images based on a comparison between the first histogram of visual features for the first digital aerial image in the first initial parallel processing cluster and the second histogram of visual features for the second digital aerial image in the second initial parallel processing cluster.

8. The system of claim 5, wherein adding the common digital aerial images to the initial parallel processing clusters to generate the parallel processing clusters comprises:

identifying an overlap threshold, wherein the overlap threshold comprises at least one of a distance, a time period, or a number of common digital aerial images; and expanding the initial parallel processing clusters of digital aerial images until the overlap threshold is satisfied.

9. The system of claim 1, further comprising instructions that, when executed by the at least one processor, cause the system to:

perform, at the client device, the feature detection; and
perform parallel processing of the digital aerial images of the site by performing, in parallel across the plurality of computing devices, the cluster three-dimensional representation generation.

10. In a digital medium environment for generating site models from aerial images, a method for parallel processing of a model generation pipeline comprising:

receiving digital aerial images of a site captured by at least one unmanned aerial vehicle;

performing, at a client device, at least one of feature detection, feature matching, three-dimensional representation generation, or georeferencing;

upon performing, at the client device at least one of the feature detection, the feature matching, the three-dimensional representation generation, or the georeferencing, performing parallel processing of the digital aerial images of the site by:

determining parallel processing clusters of the digital aerial images by analyzing, for each digital aerial image, a capture position of the digital aerial image;

sending the parallel processing clusters of the digital aerial images to a plurality of computing devices for:

performing, in parallel across the plurality of computing devices, at least one of cluster feature matching, cluster three-dimensional representation generation, cluster georeferencing, cluster three-dimensional representation refinement, cluster densification, cluster three-dimensional representation reconstruction, or cluster rendering in relation to the parallel processing clusters; and generating cluster models corresponding to the clusters of the digital aerial images in parallel across the plurality of computing devices;

in response to receiving the cluster models from the plurality of computing devices, merging the cluster models; and generating a model of the site based on the merged cluster models.

11. The method of claim 10, wherein determining the parallel processing clusters of the digital aerial images further comprises:

for each of the digital aerial images, determining a capture time for the digital aerial image; and determining the parallel processing clusters based on the capture times for the digital aerial images.

12. The method of claim 10, wherein determining the parallel processing clusters of the digital aerial images further comprises:

comparing visual content portrayed in a first digital aerial image and visual content portrayed in a second digital aerial image; and determining the parallel processing clusters based on the comparison between the visual content portrayed in the first digital aerial image and the visual content portrayed in the second digital aerial image.

13. The method of claim 10, wherein determining the parallel processing clusters of the digital aerial images comprises:

identifying initial parallel processing clusters of digital aerial images based on capture positions; and generating the parallel processing clusters by expanding the initial parallel processing clusters of digital aerial images to include common digital aerial images.

14. The method of claim 13, wherein expanding the initial parallel processing clusters of digital aerial images to include the common digital aerial images comprises:

identifying an overlap threshold, wherein the overlap threshold comprises at least one of a distance, a period of time, or a number of common digital images; and expanding the initial parallel processing clusters of digital aerial images until the overlap threshold is satisfied to generate the parallel processing clusters.

15. The method of claim 10, wherein:

generating cluster models comprises, for each parallel processing cluster, generating a cluster three-dimensional representation comprising a plurality of cluster three-dimensional points; and merging the cluster models comprises:
- identifying common cluster three-dimensional points between two or more cluster three-dimensional representations; and
- merging the two or more cluster three-dimensional representations based on the common cluster three-dimensional points.

16. A system comprising:

at least one processor; and at least one non-transitory computer readable storage medium storing instructions thereon that, when executed by the at least one processor, cause the system to:
- identify digital aerial images of a site captured by at least one unmanned aerial vehicle;
- perform, at a client device, at least one of feature detection, feature matching, three-dimensional representation generation, or georeferencing;
- perform parallel processing of the digital aerial images of the site by:
  - determining parallel processing clusters of the digital aerial images by analyzing, for each digital aerial image, visual content portrayed in the digital aerial image;
  - performing, in parallel across a plurality of computing devices that do not include the client device, at least one of cluster feature matching, cluster three-dimensional representation generation, cluster georeferencing, cluster three-dimensional representation refinement, cluster densification, cluster three-dimensional representation reconstruction, or cluster rendering in relation to the parallel processing clusters; and
  - generating in parallel, utilizing the plurality of computing devices, cluster models corresponding to the parallel processing clusters of the digital aerial images; and
- generate a model of the site by merging the cluster models.

17. The system of claim 16, wherein analyzing, for each digital aerial image, the visual content portrayed in the digital aerial image comprises:
- determining a first set of features from visual content portrayed in a first digital aerial image of the digital aerial images and a second set of features from visual content portrayed in a second digital aerial image of the digital aerial images; and
- comparing the first set of features from visual content portrayed in the first digital aerial image with the second set of features from visual content portrayed in the second digital aerial image to determine the parallel processing clusters.

18. The system of claim 16, further comprising instructions that, when executed by the at least one processor, cause the system to determine the parallel processing clusters of the digital aerial images by:
- for each of the digital aerial images, determining a capture time for the digital aerial image; and
- determining the parallel processing clusters based on the capture times for the digital aerial images.

19. The system of claim 16, further comprising instructions that, when executed by the at least one processor, cause the system to determine the parallel processing clusters of the digital aerial images by:
- identifying initial parallel processing clusters of digital aerial images; and
- generating the parallel processing clusters by expanding the initial parallel processing clusters of digital aerial images to include common digital aerial images, the common digital aerial images belonging to at least two of the initial parallel processing clusters.

20. The system of claim 19, further comprising instructions that, when executed by the at least one processor, cause the system to:
- perform, at the client device, the feature detection; and
- perform parallel processing of the digital aerial images of the site by performing, in parallel across the plurality of computing devices that do not include the client device, the cluster three-dimensional representation generation, the cluster georeferencing, the cluster three-dimensional representation refinement, the cluster densification, and the cluster three-dimensional representation reconstruction.

* * * * *